(12) United States Patent
Matsuura

(10) Patent No.: US 8,953,196 B2
(45) Date of Patent: Feb. 10, 2015

(54) IMAGE PROCESSING WORKFLOW WITH VIRTUAL PLUG-IN

(75) Inventor: Kiichi Matsuura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 675 days.

(21) Appl. No.: 12/833,365

(22) Filed: Jul. 9, 2010

(65) Prior Publication Data

US 2011/0007356 A1 Jan. 13, 2011

(30) Foreign Application Priority Data

Jul. 13, 2009 (JP) ................................. 2009-165046

(51) Int. Cl.
*G06F 3/12* (2006.01)
*H04N 1/00* (2006.01)

(52) U.S. Cl.
CPC ....... *H04N 1/00222* (2013.01); *H04N 1/00244* (2013.01); *H04N 1/0097* (2013.01); *H04N 2201/0039* (2013.01); *H04N 2201/0094* (2013.01)
USPC ........................... 358/1.15; 358/1.16; 358/443

(58) Field of Classification Search
CPC .............................. G06F 3/1225; G06F 9/44526
USPC ................................................... 358/1.1–3.29
See application file for complete search history.

(56) References Cited

U.S. PATENT DOCUMENTS

| | | | | |
|---|---|---|---|---|
| 2003/0177284 | A1* | 9/2003 | De Bonet | 709/328 |
| 2006/0218525 | A1* | 9/2006 | Yamashita | 717/109 |
| 2007/0109593 | A1* | 5/2007 | Ohta et al. | 358/1.15 |
| 2008/0235624 | A1* | 9/2008 | Murata | 715/825 |
| 2010/0131654 | A1* | 5/2010 | Malakapalli et al. | 709/227 |

FOREIGN PATENT DOCUMENTS

| | | | | |
|---|---|---|---|---|
| JP | 2003-177852 | * | 6/2003 | |
| JP | 2005-262675 | * | 9/2005 | |
| JP | 2006-18640 | | 1/2006 | |
| JP | 2006-018640 | * | 1/2006 | ...... G06F 12/00 |
| JP | 20060018640 | * | 1/2006 | ...... G06F 12/00 |
| JP | 2008-97586 | | 4/2008 | |

(Continued)

OTHER PUBLICATIONS

Japanese Office Action, Issued on Sep. 24, 2014, with Front Sheet Only, Including Prior Arts JP2005262675, and JP2003177852.*

(Continued)

*Primary Examiner* — Benny Q Tieu
*Assistant Examiner* — Marcellus Augustin
(74) *Attorney, Agent, or Firm* — Oblon, Spivak, McClelland, Maier & Neustadt, L.L.P.

(57) ABSTRACT

In an image forming device adapted to acquire image data and distribute the image data, a storage unit stores respective plug-in modules of an input process, an image transforming process, and an output process with respect to the image data. A combining information acquisition unit acquires combining information including plug-in identifiers which respectively indicate the plug-in modules. A combining unit combines two or more of the plug-in modules to generate a virtual plug-in based on the combining information. A flow setting unit sets up a workflow in which the plug-in modules including the virtual plug-in are combined arbitrarily. A workflow control unit controls processes included in the workflow when a message distribution process based on the workflow is requested.

11 Claims, 31 Drawing Sheets

(56) References Cited

FOREIGN PATENT DOCUMENTS

| | | |
|---|---|---|
| JP | 2008-217136 | 9/2008 |
| JP | 2008-234233 | 10/2008 |
| JP | 2009-225059 | 10/2009 |

OTHER PUBLICATIONS

Office Action issued Sep. 24, 2014 in Japanese Patent Application No. 2013-215450.

* cited by examiner

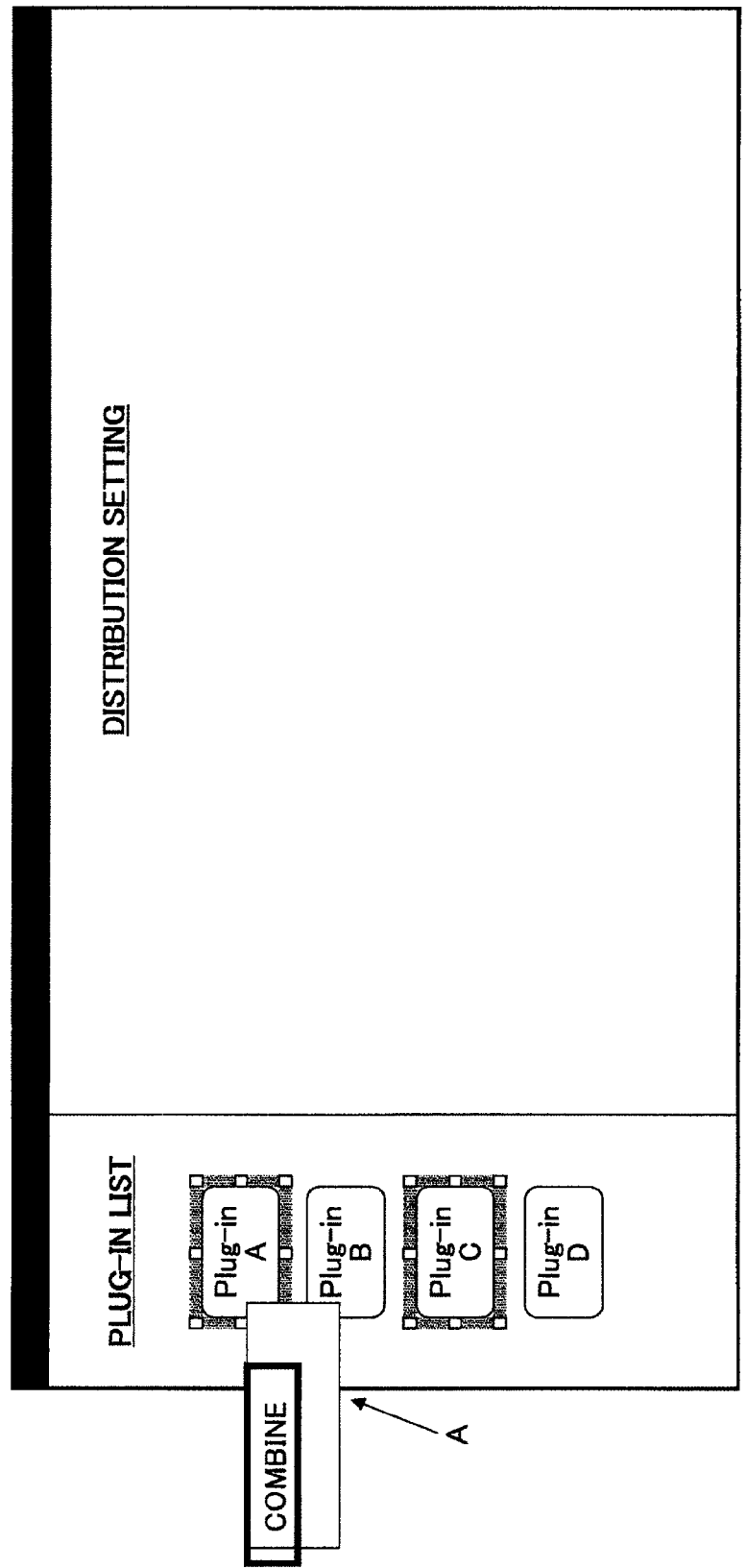

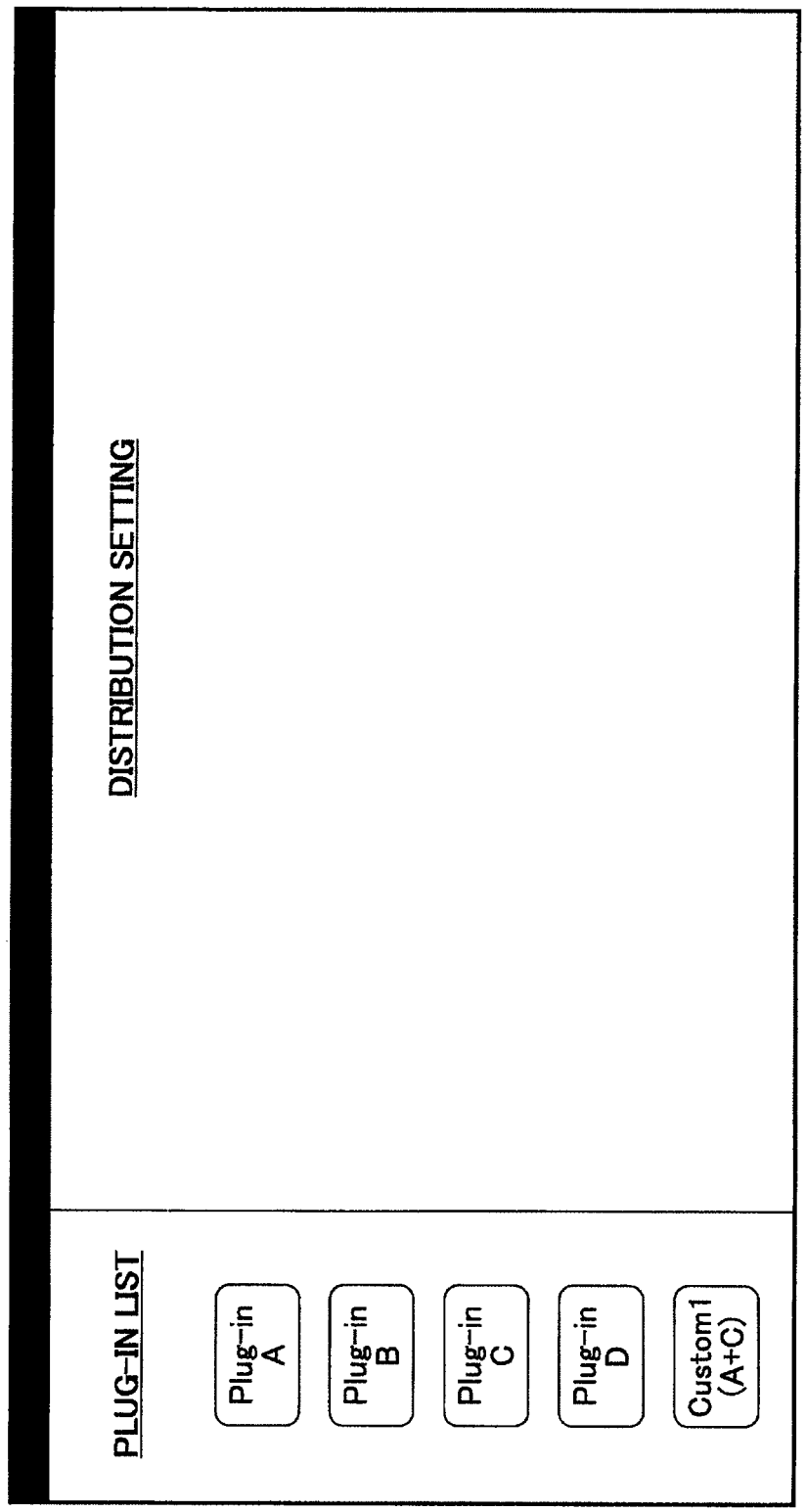

FIG.8

| P-ID | PLUG-IN NAME | SETTING |
|---|---|---|
| 001 | PluginA | SETTING1 |
| | | SETTING2 |
| | | SETTING3 |
| 002 | PluginB | SETTING1 |
| | | SETTING2 |
| 003 | PluginC | SETTING1 |
| | | SETTING2 |
| 004 | PluginD | SETTING1 |
| 005 | Custom1 | – |
| ⋮ | ⋮ | ⋮ |

FIG.9

| P-ID | VIRTUAL PLUG-IN NAME | P-ID (BEFORE) | P-ID (AFTER) |
|---|---|---|---|
| 005 | Custom1 | 001-SETTING1 | 003-SETTING2 |
| 008 | Custom2 | 004-SETTING1 | 003-SETTING1 |
| ... | ... | ... | ... |

FIG.10

| W-ID | WORKFLOW NAME | P-ID | SETTING |
|---|---|---|---|
| 001 | ProjectA | 001 | SETTING1 |
| | | 004 | SETTING1 |
| | | 003 | SETTING2 |
| 002 | ProjectB | 001 | SETTING2 |
| | | 003 | SETTING1 |
| 003 | ProjectC | 001 | SETTING2 |
| | | 005 | – |
| ⋮ | ⋮ | ⋮ | ⋮ |

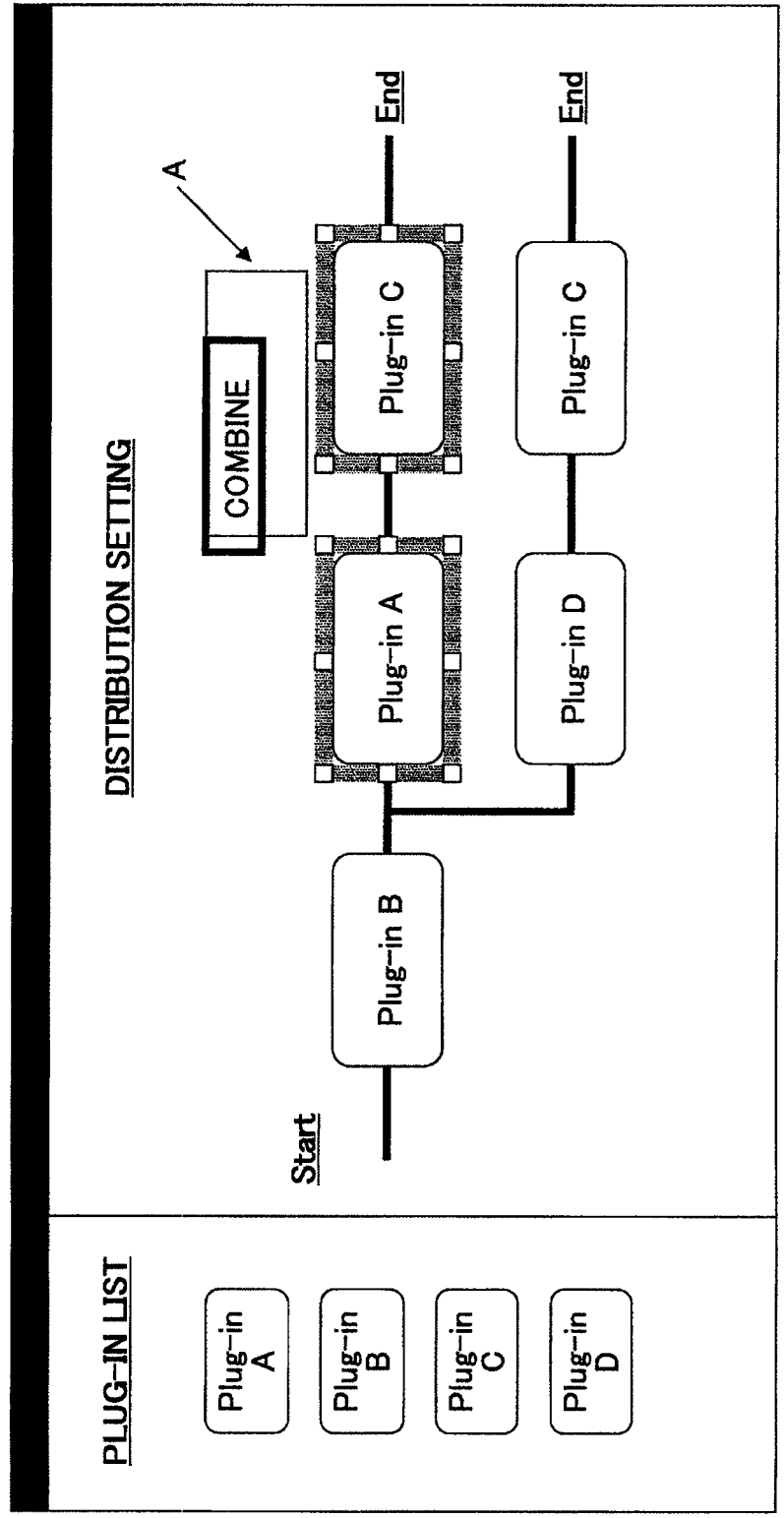

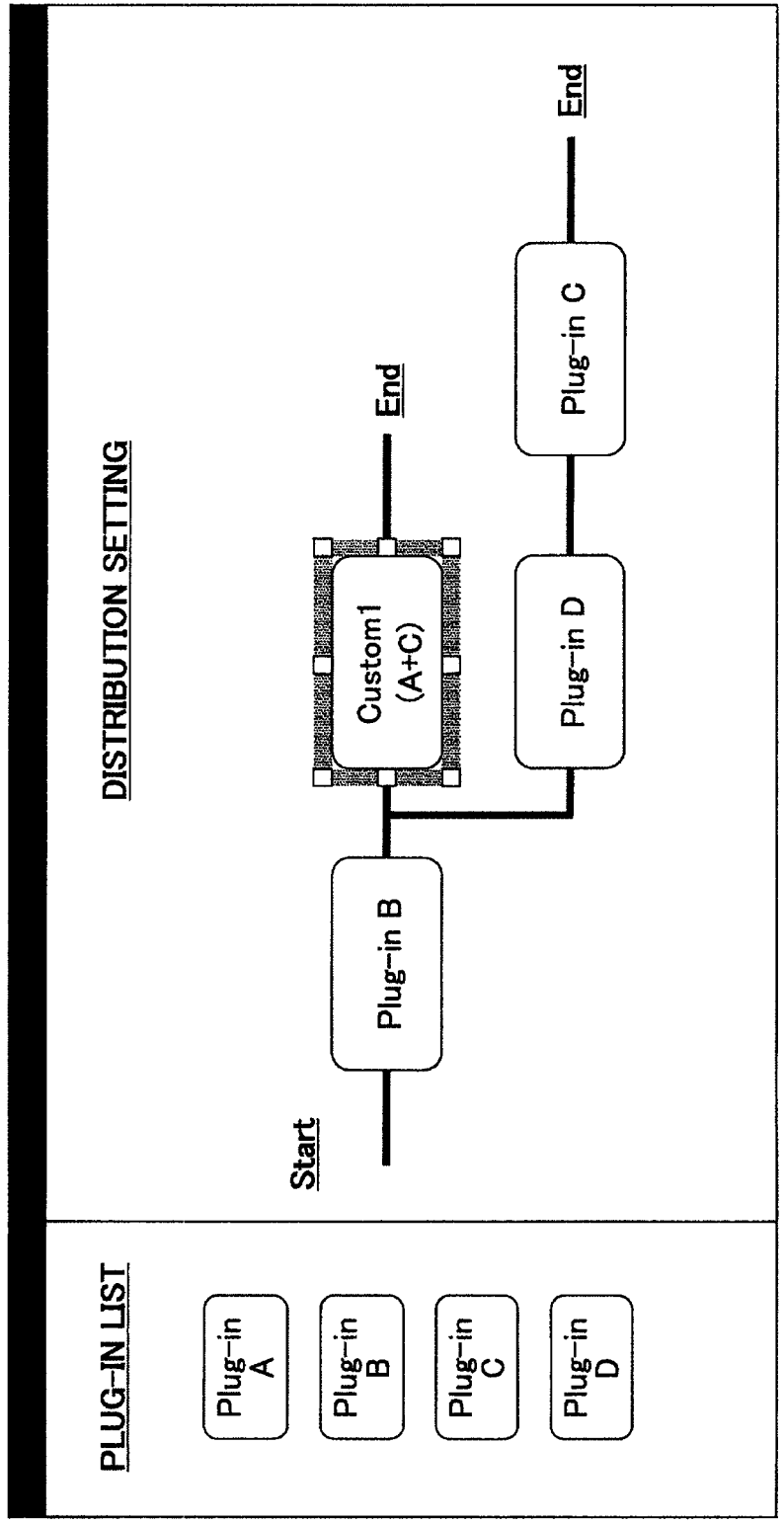

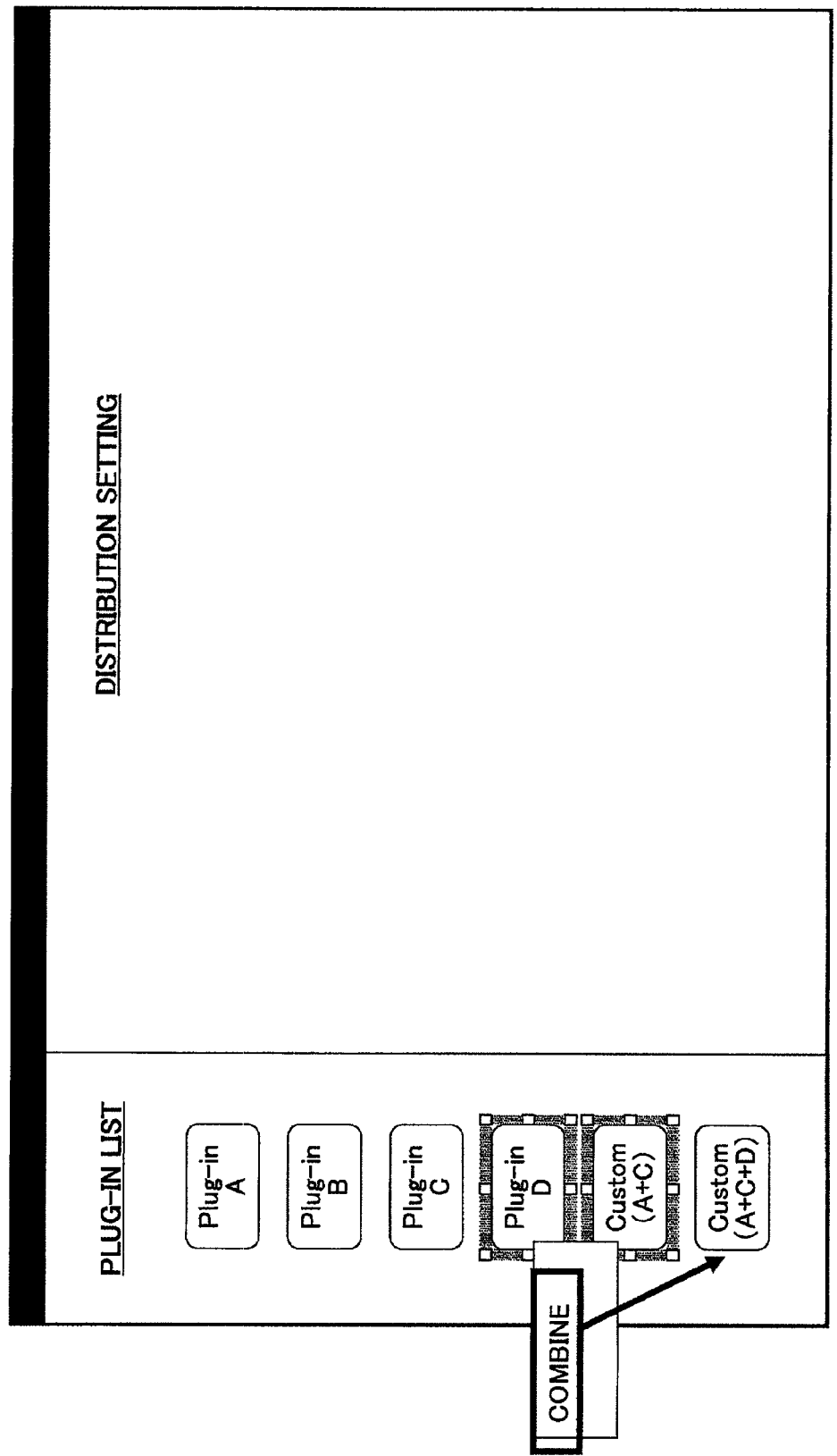

FIG.16

| P-ID | VIRTUAL PLUG-IN NAME | P-ID (BEFORE) | P-ID (AFTER) | TRANSFER |
|---|---|---|---|---|
| 005 | Custom1 | 001-SETTING1 | 003-SETTING2 | YES |
| 008 | Custom2 | 004 | 003 | NO |
| ... | ... | ... | ... | ... |

FIG.18

| P-ID | VIRTUAL PLUG-IN NAME | P-ID (BEFORE) | P-ID (AFTER) | USE LIMIT |
|---|---|---|---|---|
| 005 | Custom1 | 001-SETTING1 | 003-SETTING2 | Project |
| 008 | Custom2 | 004 | 003 | Profile |
| ... | ... | ... | ... | ... |

FIG.20A

| ID | NAME OF WORKFLOW | PROCESS | SETTING ITEM | SETTING DATA | |
|---|---|---|---|---|---|
| 001 | ProjectA | ToFolder | LOG IN | NO | ...... |
| | | | DESTINATION | ¥¥133.139.x.xx¥shared | ...... |
| | | | USER NAME | user01 | ...... |
| | | | PASSWORD | !password | ...... |
| | | ToSMTP | LOG IN | NO | ...... |
| | | | MAIL SERVER | 133.139.8.19 | ...... |
| | | | URL | test@yyy.com | ...... |
| | | | USER NAME | user01 | ...... |
| | | | PASSWORD | !password | ...... |

FIG.20B

| ID | NAME OF WORKFLOW | PROCESS | SETTING ITEM | SETTING DATA | |
|---|---|---|---|---|---|
| 001 | ProjectA | ToFolder + ToSMTP | LOG IN | NO | ...... |
| | | | USER NAME | user01 | ...... |
| | | | PASSWORD | !password | ...... |
| | | | DESTINATION | ¥¥133.139.x.xx¥ shared | ...... |
| | | | MAIL SERVER | 133.139.8.19 | ...... |
| | | | URL | test@yyy.com | ...... |

FIG.21A

| ID | NAME OF WORKFLOW | PROCESS | SETTING ITEM | SETTING DATA | |
|---|---|---|---|---|---|
| 002 | ProjectB | SCAN | RESOLUTION | 400 | ...... |
| | | | COLOR/B & W | COLOR | ...... |
| | | OCR | UP/DN RECOG. | NO | ...... |
| 003 | ProjectC | SCAN | DOC. TYPE | FULL-COLOR | ...... |
| | | I. TRANS. | FORMAT | JPEG | ...... |

FIG.21B

| ID | NAME OF WORKFLOW | PROCESS | SETTING ITEM | SETTING DATA | |
|---|---|---|---|---|---|
| 002 | ProjectB | SCAN + OCR | RESOLUTION | 300 | ..... |
| | | | COLOR/B & W | COLOR | ..... |
| | | | UP/DN RECOG. | NO | ..... |
| 003 | ProjectC | SCAN | DOC. TYPE | FULL-COLOR | ..... |
| | | I. TRANS. | FORMAT | JPEG | ..... |

FIG.24A

| INHIBITION ID | PLUG-IN ID | PLUG-IN ID |
|---|---|---|
| 001 | 001 | 005 |
| 002 | 002 | 005 |
| ⋮ | ⋮ | ⋮ |

FIG.24B

| INHIBITION ID | PLUG-IN | | | PLUG-IN | | |
|---|---|---|---|---|---|---|
| | PLUG-IN NAME | SETTING DATA | SETTING DATA | PLUG-IN NAME | SETTING DATA | SETTING DATA |
| 101 | SCAN | A4 | ... | OCR | A3 | ... |
| 102 | SCAN | MULTI | ... | PDF | SINGLE | ... |
| ... | ... | ... | | ... | ... | ... |

IMAGE PROCESSING WORKFLOW WITH VIRTUAL PLUG-IN

BACKGROUND OF THE INVENTION

1. Field of the Invention

This invention relates to an image forming device, an image processing device, an image processing system, an image processing method, and a recording medium which are adapted to distribute image data.

2. Description of the Related Art

In recent years, many companies have made progress in the arrangement and connection of image input/output devices, such as multifunctional peripherals (MFPs), to networks. The image input/output devices play a key role as means for increasing the efficiency of business. Especially, the roles of a distribution management system in generating electronic data of paper documents and distributing the electronic data of paper documents efficiently are becoming important. The major elements which constitute the distribution management system are an image input device (for example, a scanner, etc.) and a distribution managing server. In the distribution managing server, a plurality of message distribution process menus which are adapted for various business tasks and uses are registered beforehand. A user selects a process menu suitable for a particular business task from an operation panel (operation unit) of a scanner and starts scanning of a document by the scanner.

For example, Japanese Laid-Open Patent Publication No. 2006-018640 discloses an information input device which enables the user or an administrator to input an arbitrary combination of message distribution process plug-in modules and image transforming process plug-in modules, create a workflow of image inputting, image transforming and image outputting processes, and perform a message distribution process of image data by using the created workflow.

It is common that plug-in modules supplied by vendors are to specify a small-size process by taking various users into consideration. Although the user who wishes to set up a workflow can set up various combinations of the workflow, the size of the plug-in modules is small, and the user has to combine the same plug-in module repeatedly.

Moreover, when it is specified for a certain company or a certain department that a plug-in module 2 is to be executed after an end of execution of a plug-in module 1, the plug-in modules 1 and 2 cannot be simultaneously used to set up the workflow. It is necessary to set up the workflow by using the plug-in module 1 and the plug-in module 2 sequentially in this order.

SUMMARY OF THE INVENTION

In one aspect of the invention, the present disclosure provides an image forming device, an image processing system, an information processing method, and a recording medium which are capable of combining plug-in modules arbitrarily to generate a virtual plug-in and setting up a workflow by using the generated virtual plug-in.

In an embodiment of the invention which solves or reduces one or more of the above-mentioned problems, the present disclosure provides an image forming device which is adapted to acquire image data and distribute the image data, the image forming device including: a storage unit configured to store respective plug-in modules of an input process, an image transforming process, and an output process with respect to the image data; a combining information acquisition unit configured to acquire combining information including two or more plug-in identifiers which respectively indicate the plug-in modules stored in the storage unit; a combining unit configured to combine two or more of the plug-in modules and generate a virtual plug-in based on the combining information acquired by the combining information acquisition unit; a flow setting unit configured to set up a workflow in which the plug-in modules including the virtual plug-in are combined arbitrarily; and a workflow control unit configured to control processes included in the workflow when a message distribution process based on the workflow is requested.

In an embodiment of the invention which solves or reduces one or more of the above-mentioned problems, the present disclosure provides an image processing device which is adapted to acquire image data and distribute the image data, the image processing device including: a storage unit configured to store respective plug-in modules of an input process, an image transforming process, and an output process with respect to the image data; a combining information acquisition unit configured to acquire combining information including two or more plug-in identifiers which respectively indicate the plug-in modules stored in the storage unit; a combining unit configured to combine two or more of the plug-in modules and generate a virtual plug-in based on the combining information acquired by the combining information acquisition unit; a flow setting unit configured to set up a workflow in which the plug-in modules including the virtual plug-in are combined arbitrarily; and a workflow control unit configured to control processes included in the workflow when a message distribution process based on the workflow is requested.

In an embodiment of the invention which solves or reduces one or more of the above-mentioned problems, the present disclosure provides an image processing system including an image processing device and an image forming device which are connected via a network, the image processing device including: a storage unit configured to store respective plug-in modules of an input process, an image transforming process, and an output process with respect to image data; a combining information acquisition unit configured to acquire combining information including two or more plug-in identifiers which respectively indicate the plug-in modules stored in the storage unit; a combining unit configured to combine two or more of the plug-in modules and generate a virtual plug-in based on the combining information acquired by the combining information acquisition unit; a flow setting unit configured to set up a workflow in which the plug-in modules including the virtual plug-in are combined arbitrarily; and a workflow control unit configured to control processes included in the workflow when a message distribution process based on the workflow is requested, and the image forming device including: a reading unit configured to read an image and acquire image data from the image; a receiving unit configured to receive a specification of the workflow; and a communication unit configured to transmit the image data and a request of a message distribution process based on the workflow to the image processing device.

Other objects, features and advantages of the present disclosure will become more apparent from the following detailed description when read in conjunction with the accompanying drawings.

BRIEF DESCRIPTION OF THE DRAWINGS

FIG. 7A and FIG. 7B are diagrams for explaining an example of transition of a UI screen which illustrates a combination of plug-in modules.

FIG. 8 is a diagram for explaining a data structure of a plug-in list.

FIG. 9 is a diagram for explaining a data structure of virtual plug-in information.

FIG. 10 is a diagram for explaining a data structure of a workflow list.

FIG. 11A and FIG. 11B are diagrams for explaining an example of transition of a UI screen which illustrates a combination of plug-in modules.

FIG. 12 is a diagram illustrating an example of a screen when a virtual plug-in module is further combined to generate a virtual plug-in module.

FIG. 16 is a diagram for explaining a data structure of virtual plug-in information including a transfer setting option.

FIG. 18 is a diagram for explaining a data structure of virtual plug-in information including a use limit option.

FIG. 20A and FIG. 20B are diagrams for explaining a data structure when a merging process is performed.

FIG. 21A and FIG. 21B are diagrams for explaining a data structure when setting data of a plug-in is changed.

FIG. 24A and FIG. 24B are diagrams for explaining a data structure of combination inhibition information.

DETAILED DESCRIPTION OF THE PREFERRED EMBODIMENTS

A description will be given of embodiments of the present disclosure with reference to the accompanying drawings.

In the following, embodiments of an image processing system, an image forming device, an image processing device (or image processing server), an image processing method, and a recording medium according to the present disclosure will be described with reference to the accompanying drawings.

In the following, a multifunctional peripheral (MFP) having multiple functions including a printer function, a scanner function, a copier function, a facsimile function, etc. installed in a housing will be described as an exemplary image input device which inputs image data. However, the image input device is not limited. Alternatively, another image input device which can input image data, including a scanner, a facsimile, a copier, etc. may be used instead.

Figure 1:
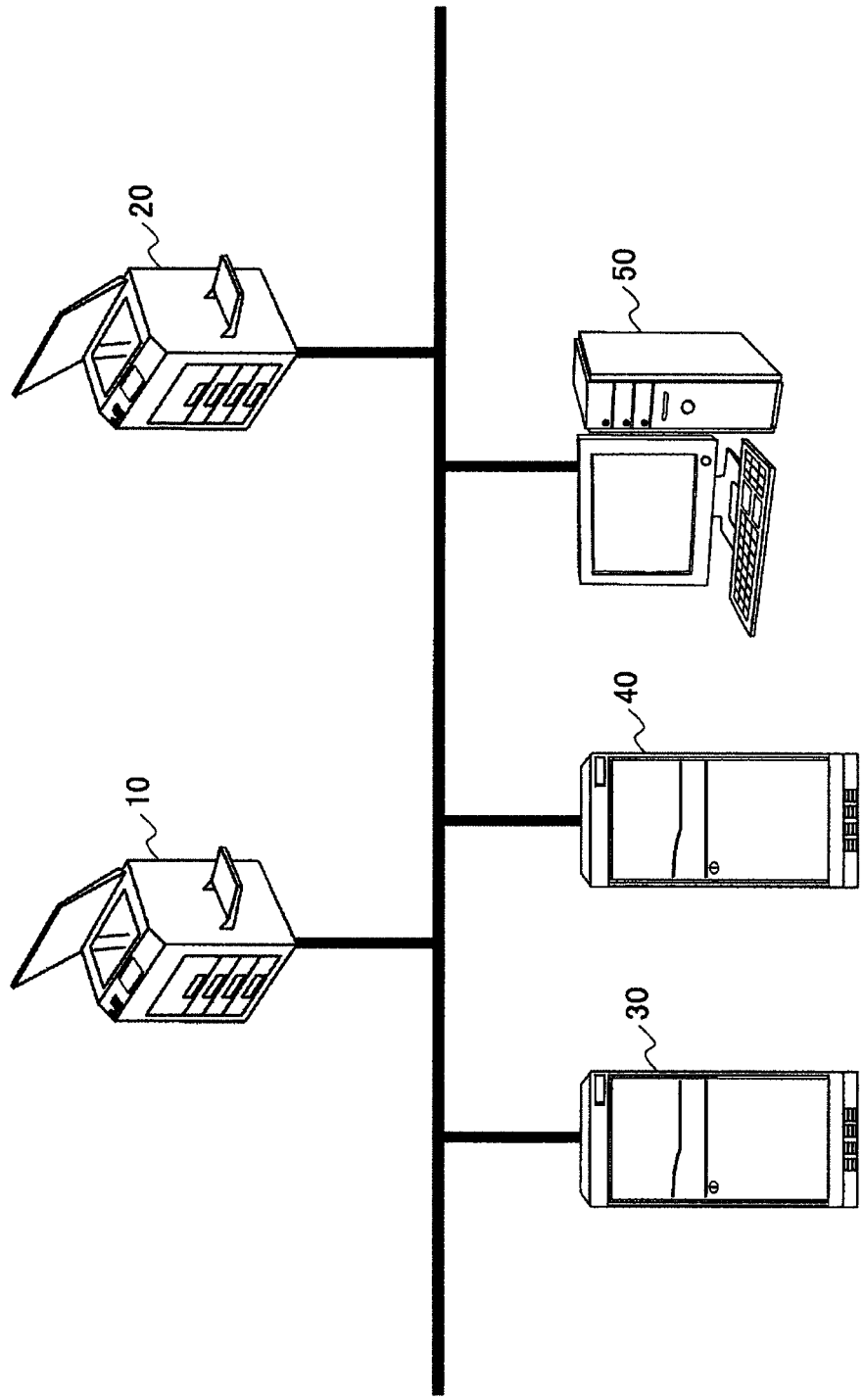
FIG. 1 is a diagram illustrating the composition of an image processing system of a first embodiment of the present disclosure.

FIG. 1 illustrates the composition of an image processing system of a first embodiment of the present disclosure. As illustrated in FIG. 1, in the image processing system, an MFP (multifunctional peripheral) 10, an MFP 20, an image processing server 30, an image management server 40, and an information processing terminal 50 (for example, a PC (personal computer), a PDA (personal data assistance), etc.) are connected via a network.

In the following, the MFP will be described as an exemplary image forming device. Each of the MFPs 10 and 20 has multiple functions including a scanner function, a copier function, a printer function, a facsimile function, etc. installed in a housing. Each of the MFPs 10 and 20 is capable of performing the scanning of paper documents by the scanner function to generate image data and transmitting the generated image data to the image processing server 30. The details of MFP will be described later. The image data contain image data of documents.

The image processing server 30 is a computer, such as a workstation, which receives the image data scanned and generated by each MFP, and performs various processes or message distribution processes in accordance with specified workflows. The workflows contain e-mail transmission, FAX transmission, folder distribution, etc.

The image processing server 30 functions as a server which performs a workflow based on the input image data, and performs accumulation or message distribution processes of documents in accordance with a workflow created by a user. Namely, the image processing server 30 also functions as an image processing device which performs image processing. The details of the image processing server 30 will be described later. Alternatively, the image processing server 30 may be included in the MFP 10 or 20.

The image management server 40 is a server which stores and manages the image data distributed by the image processing server 30. The image management server 40 may register image types of the stored image data, and may search a desired data item in the stored image data.

The information processing terminal 50 is arranged to create, if a management tool of message distribution processes is initiated by an administrator, a workflow by selecting respective plug-in modules of image inputting, image transforming, and image outputting sequentially. The number of MFPs, the number of servers, and the number of information processing terminals, which are connected via the network, may be arbitrarily determined. When the image processing server 30 is incorporated in the MFP, the MFP may be arranged to create a workflow.

Figure 2:
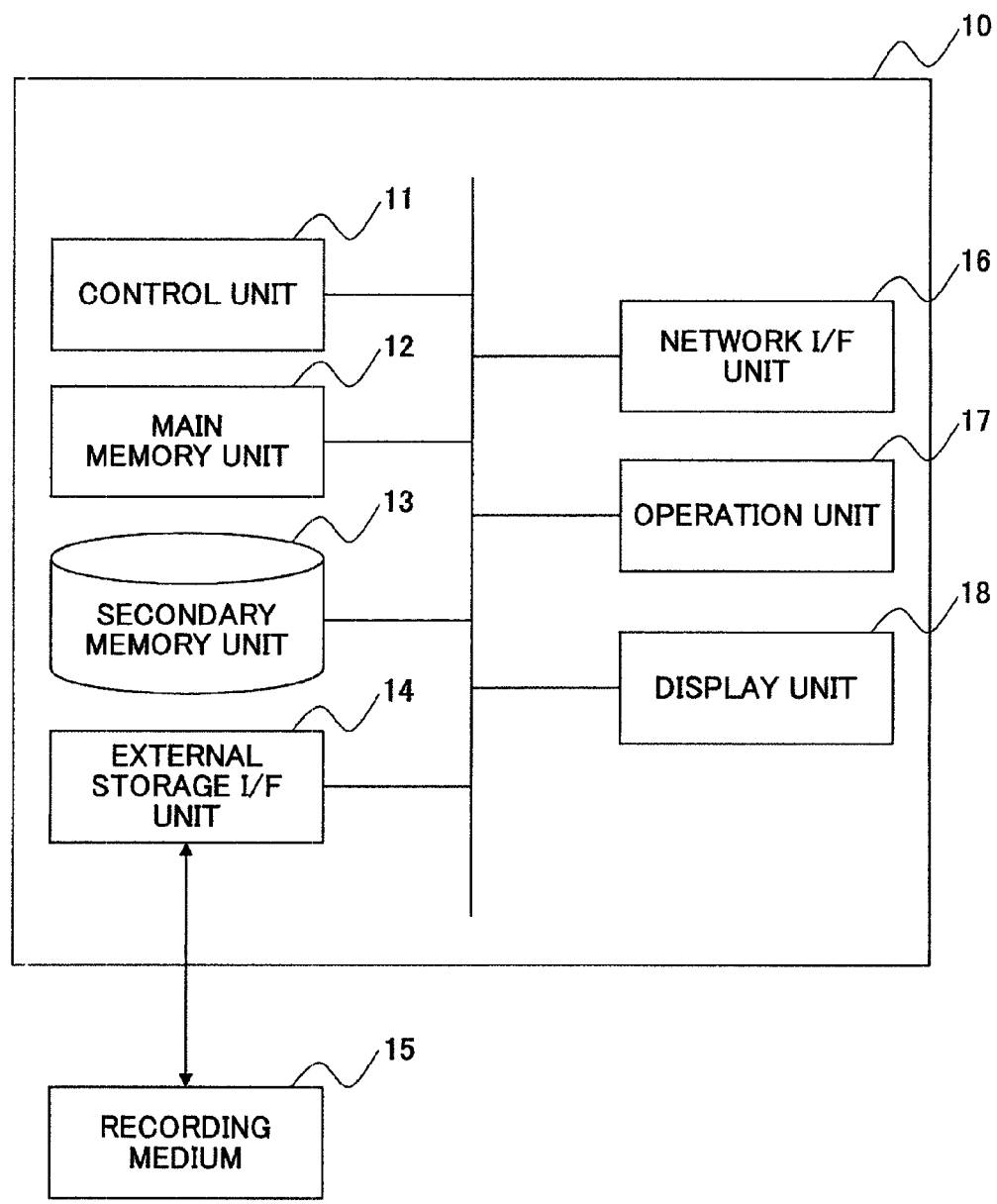
FIG. 2 is a block diagram illustrating the hardware composition of an MFP of the first embodiment.

FIG. 2 illustrates the hardware composition of the MFP 10 of the first embodiment. As illustrated in FIG. 2, the MFP 10 includes a control unit 11, a main memory unit 12, a secondary memory unit 13, an external storage I/F (interface) unit 14, a network I/F (interface) unit 16, an operation unit 17, and a display unit 18.

The control unit 11 is a CPU which performs control of the respective elements of the MFP and computations and processing of data. The control unit 11 is a processor unit which executes a program stored in the main memory unit 12. The processor unit receives data from an input unit or a memory unit, performs computations and processing of the received data, and outputs the results of the computations and processing to an output unit or a memory unit.

The main memory unit 12 includes a ROM (read only memory), a RAM (random access memory), etc. The main memory unit 12 permanently or temporarily stores data and programs, including the operating system (OS), application programs, etc., which are executed by the control unit 11. The secondary memory unit 13 is a HDD (hard disk drive), etc., and the secondary memory unit 13 stores the application programs, the related data thereof, etc.

The external storage I/F unit 14 provides an interface between the MFP and a recording medium 15 (for example, a flash memory, etc.) which is connected to the MFP via a data transmission line, such as USB (universal serial bus). A predetermined program is stored in the recording medium 15, the recording medium 15 is connected to the MFP, and the stored program is installed in the MFP 10 via the external storage I/F unit 14, so that the MFP 10 is able to execute the program installed therein.

The network I/F unit 16 provides an interface between the MFP and a peripheral device having a communication function and connected to the MFP via a network, such as LAN (local area network) or WAN (wide area network) created by wired or wireless data transmission lines.

The operation unit 17 and the display unit 18 constitute an operation panel of the MFP. This operation panel includes a set of key switches (hard keys) and an LCD (liquid crystal display) with a touch-panel function. The LCD with the touch-panel function includes a set of GUI (graphical user interface) software keys. The operation panel constituted by the operation unit 17 and the display unit 18 is an input/display unit which provides a user interface (UI) for a user when using any of the functions provided by the MFP 10.

Figure 3:
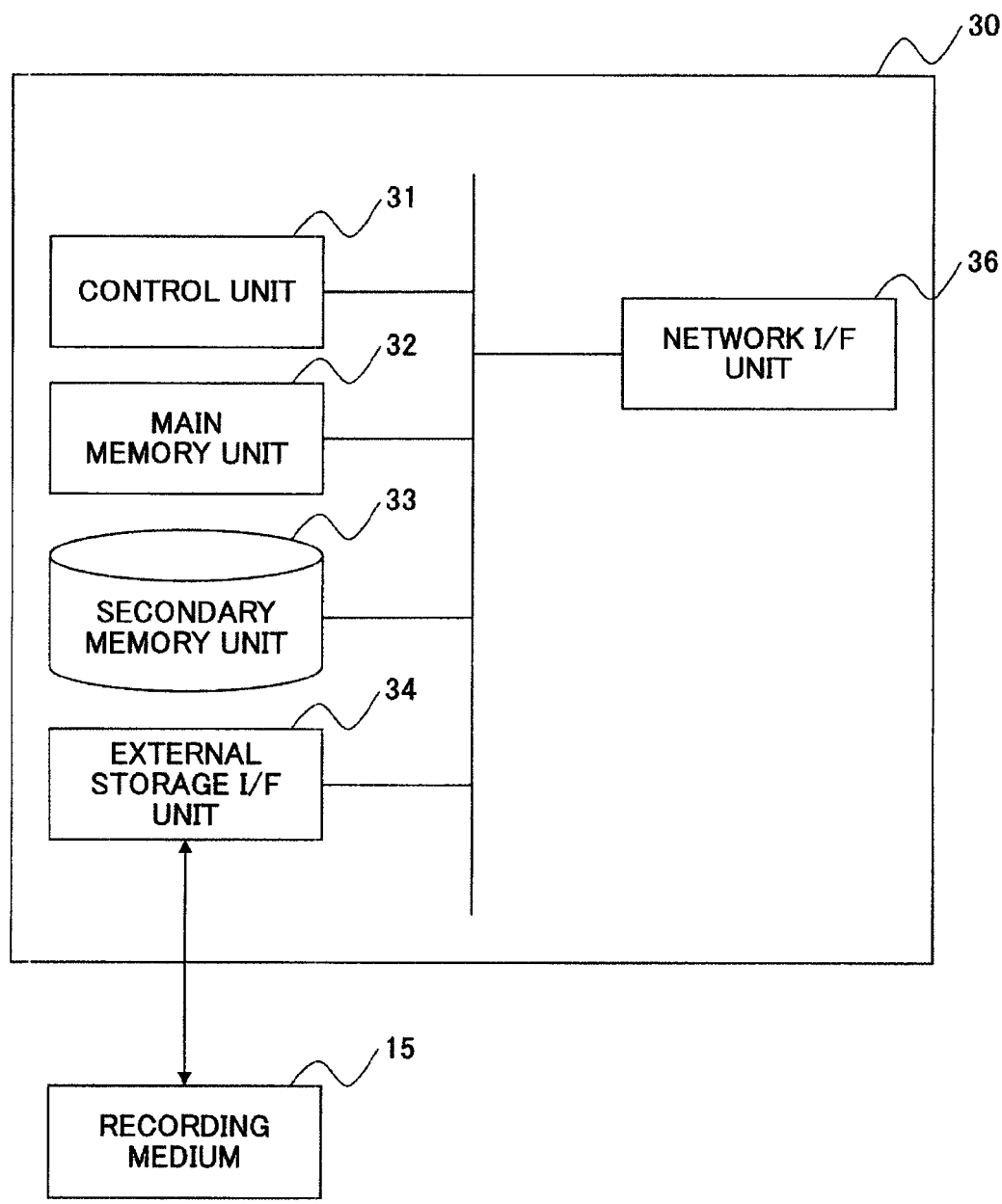
FIG. 3 is a block diagram illustrating the hardware composition of an image processing server of the first embodiment.

FIG. 3 illustrates the hardware composition of the image processing server 30 of the first embodiment. As illustrated in FIG. 3, the image processing server 30 includes a control unit 31, a main memory unit 32, a secondary memory unit 33, an external storage I/F unit 34, and a network I/F unit 36.

The control unit 31 is a CPU which performs control of the respective elements of the image processing server 30 and computations and processing of data. The control unit 31 is a processor unit which executes a program stored in the main memory unit 32. The processor unit receives data from an input unit or a memory unit, performs computations and processing of the received data, and outputs the results of the computations and processing to an output unit or a memory unit.

The main memory unit 32 includes a ROM, a RAM, etc. The main memory unit 32 permanently or temporarily stores data and programs, including the OS, application programs, etc., which are executed by the control unit 31. The secondary memory unit 33 is a HDD, etc., and the secondary memory unit 33 stores the application programs, the related data thereof, etc.

The external storage I/F unit 34 provides an interface between the image processing server 30 and a recording medium 15 (for example, a flash memory, etc.) connected to the image processing server 30 via a data transmission line, such as USB. A predetermined program is stored in the recording medium 15, the recording medium 15 is connected to the image processing server 30, and the stored program is installed in the image processing server 30 via the external storage I/F unit 34, so that the image processing server 30 is able to execute the program installed therein.

The network I/F unit 36 provide an interface between the image processing server 30 and a peripheral device having a communication function and connected to the image processing server 30 via a network, such as LAN or WAN created by wired or wireless data transmission lines.

Figure 4:
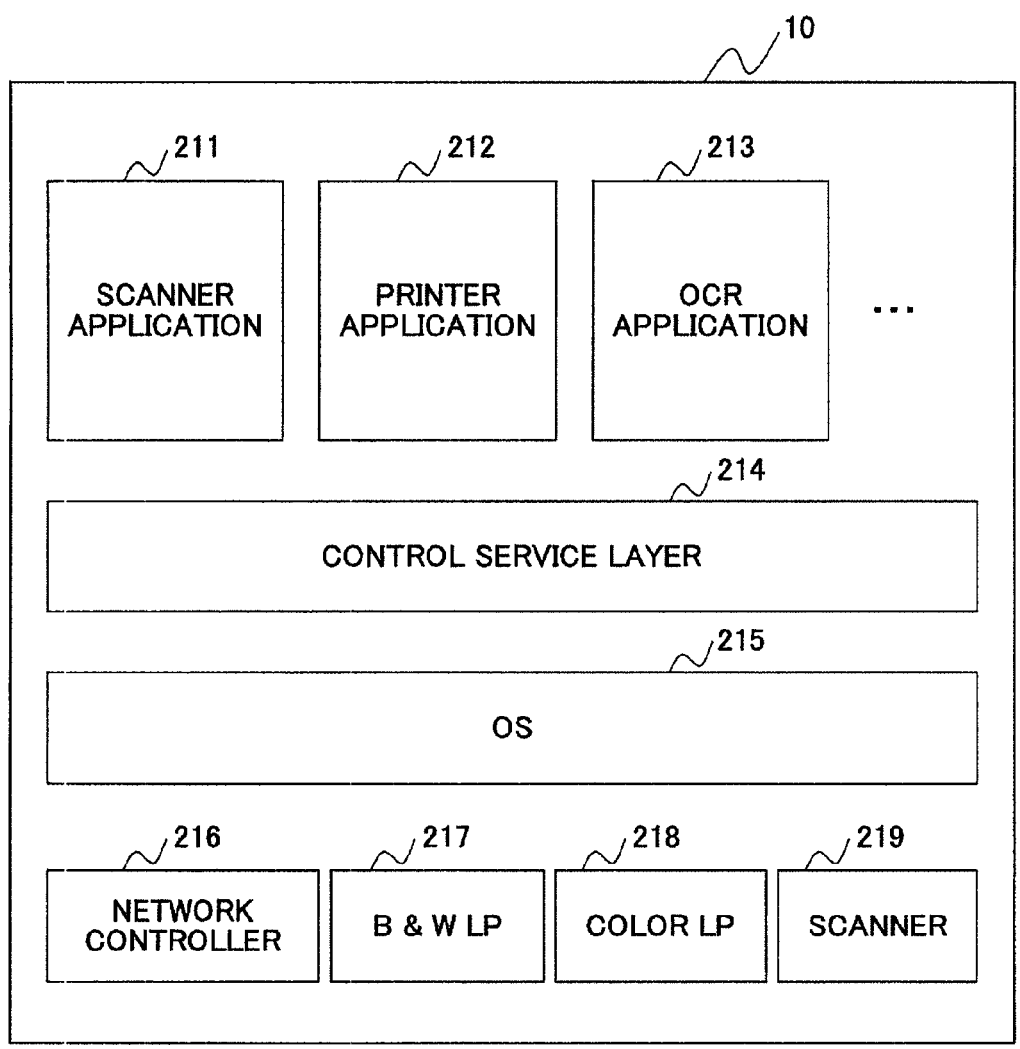
FIG. 4 is a block diagram illustrating the composition of an MFP of the first embodiment.

FIG. 4 illustrates the composition of the MFP 10 of the first embodiment. As illustrated in FIG. 4, the MFP 10 includes a scanner application 211, a printer application 212, an OCR (optical character recognition) application 213, a control service layer 214, an OS (operating system) 215, a network controller 216, a B&W LP (black-and-white laser printer) 217, a color LP (color laser printer) 218, and a scanner 219.

The scanner application 211 is an application for a scanner which scans an image and acquires image data from the image. The printer application 212 is an application for a printer provided with page description language (PDL), PCL or PostScript (PS). The OCR application 213 is an application for an OCR reader which performs optical character recognition.

The control service layer 214 is a control service which interprets a processing request sent from an application and generates a request of acquisition of the hardware resources. The OS 215 is a general-purpose operating system, such as UNIX (registered trademark), and executes respective application programs as processes in parallel. The OS 215 is not limited to UNIX (registered trademark) and any other OS may be used instead.

The network controller 216 performs processes including a transform process of transforming image data from the scanner into data in a bit map format, a preparatory process for an SNMP protocol communication, etc. The B&W LP 217 is a monochrome laser printer. The color LP 218 is a color laser printer. The scanner 219 scans an image and acquires image data from the image. The MFP 10 provides the hardware resources, including the network controller 216, the B&W LP 217, the Color LP 218, the scanner 219, a facsimile and a memory. As illustrated in FIG. 4, the MFP 10 has the multiple functions, and it is necessary to use the hardware resources of the MFP 10 efficiently.

Figure 5:
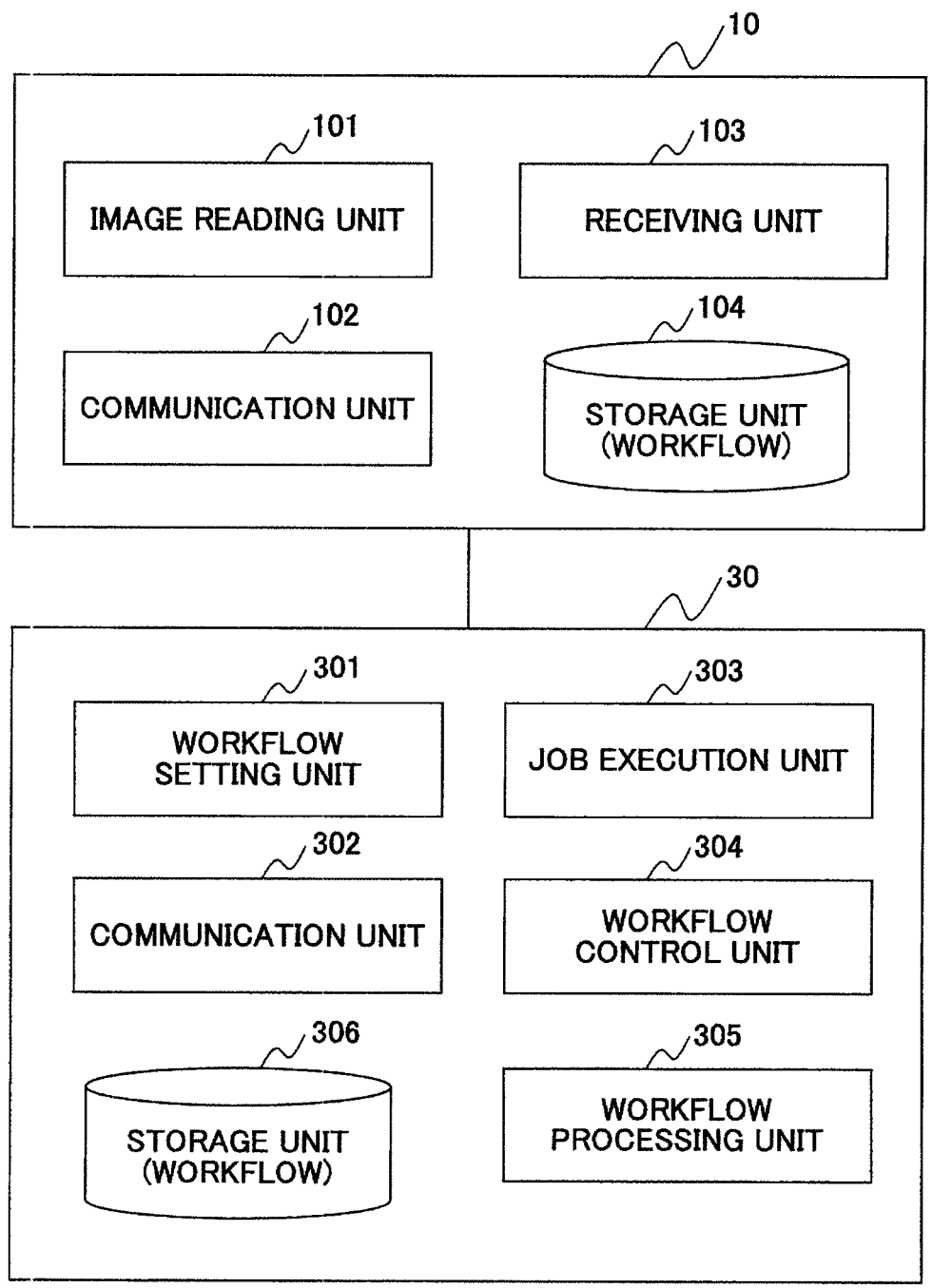
FIG. 5 is a block diagram illustrating the functional composition of an MFP and an image processing server of the first embodiment.

FIG. 5 illustrates the functional composition of the MFP 10 and the image processing server 30 of the first embodiment.

The functional composition of the MFP 10 will be described. In the example of FIG. 5, the MFP 10 and the image processing server 30 are provided as separate devices. Alternatively, the image processing server 30 may be incorporated in the MFP 10.

As illustrated in FIG. 5, the MFP 10 includes an image reading unit 101, a communication unit 102, a receiving unit 103, and a storage unit 104. In the example of FIG. 5, illustration of a printer function, a copier function, a facsimile function, etc., which are commonly provided by the MFP 10 is omitted for the sake of convenience.

The image reading unit 101 reads a document by using the scanning function, and acquires image data from the document. Image data may be received by using the facsimile function or may be acquired from the information processing terminal 50.

The communication unit 102 performs transmission and receiving of device information and image data, etc. Especially, when a request of workflow processing of image data is requested by the user, the communication unit 102 transmits the image data and the request concerned to the image processing server 30.

The receiving unit 103 receives specification of a workflow from the user. This specification of a workflow is input by the user using the operation unit 17 and the display unit 18. At this time, the user inputs bibliographic information of processes included in the workflow. For example, in a case of an image transforming process, the bibliographic information contains an image format, an image size, etc. For example, in a case of an e-mail distribution process, the bibliographic information contains an e-mail address of a distribution destination, etc. A user ID as the bibliographic information is acquired from user information of a user who has logged in to the image processing system.

The storage unit 104 stores respective plug-in modules of an input process, an image transforming process and an output process, and stores one or more workflows which are created by combining relevant plug-in modules. The storage unit 103 is not essential to the MFP 10. Alternatively, the MFP 10 may be arranged to acquire the workflow-related information from a storage unit 306 of the image processing server 30.

Next, the functional composition of the image processing server 30 will be described. As illustrated in FIG. 5, the image processing server 30 includes a workflow setting unit 301, a communication unit 302, a job execution unit 303, a workflow control unit 304, a workflow processing unit 305, and a storage unit 306.

When a workflow is set up by a user by arbitrarily combining any of the respective plug-in modules of an input process, an image transforming process and an output process, the workflow setting unit 301 stores the workflow in an XML format into the storage unit 306. The details of the workflow setting unit 301 will be described later with reference to FIG. 6.

The communication unit 302 performs transmission and receiving of device information, image data, etc. Especially, the communication unit 302 receives image data from the MFP 10 or transmits the image data as a result of image processing to the destination to which the workflow has been distributed.

The communication unit 302 receives the identification information of a workflow, the bibliographic information of each of processes in a workflow, etc. from the MFP 10. When a processing request (job request) of a workflow is received from the MFP 10, the communication unit 302 outputs the identification information of the workflow, the bibliographic information of each of the processes in the workflow, etc. to the job execution unit 303.

The job execution unit 303 performs a job requested by the MFP 10. The job execution unit 303 sends a processing request of a workflow to the workflow control unit 304, and outputs the identification information of the workflow, the bibliographic information of each of the processes in the workflow, and image data, to the workflow control unit 304.

When a processing request of a workflow is received from the job execution unit 303, the workflow control unit 304 controls execution of each of the processes included in the workflow. When a request of workflow control is received from the workflow control unit 304, the workflow processing unit 305 performs the workflow in accordance with the request and performs a message distribution process. Namely, the workflow processing unit 305 performs each of the processes included in the workflow sequentially in order of the workflow, and distributes the image data to the distribution destination.

The processes which are performed by the workflow processing unit 305 are divided into a distribution process, an image processing, and a message distribution process (output process). The distribution process is a process of determining a destination to which the image data are distributed. For example, based on the final process included in the workflow, it is determined whether the destination to which the image data are distributed is a mail server or a folder.

The image process is a process of performing image transformation, such as PDF conversion or TIFF conversion. The message distribution process is a process of distributing the image data to the distribution destination determined by the distribution process. At least the message distribution process is performed by the workflow processing unit 305.

The storage unit 306 stores respective plug-in modules of an input process, an image transforming process and an output process, and stores one or more workflows which are created by combining relevant plug-in modules.

Figure 6:
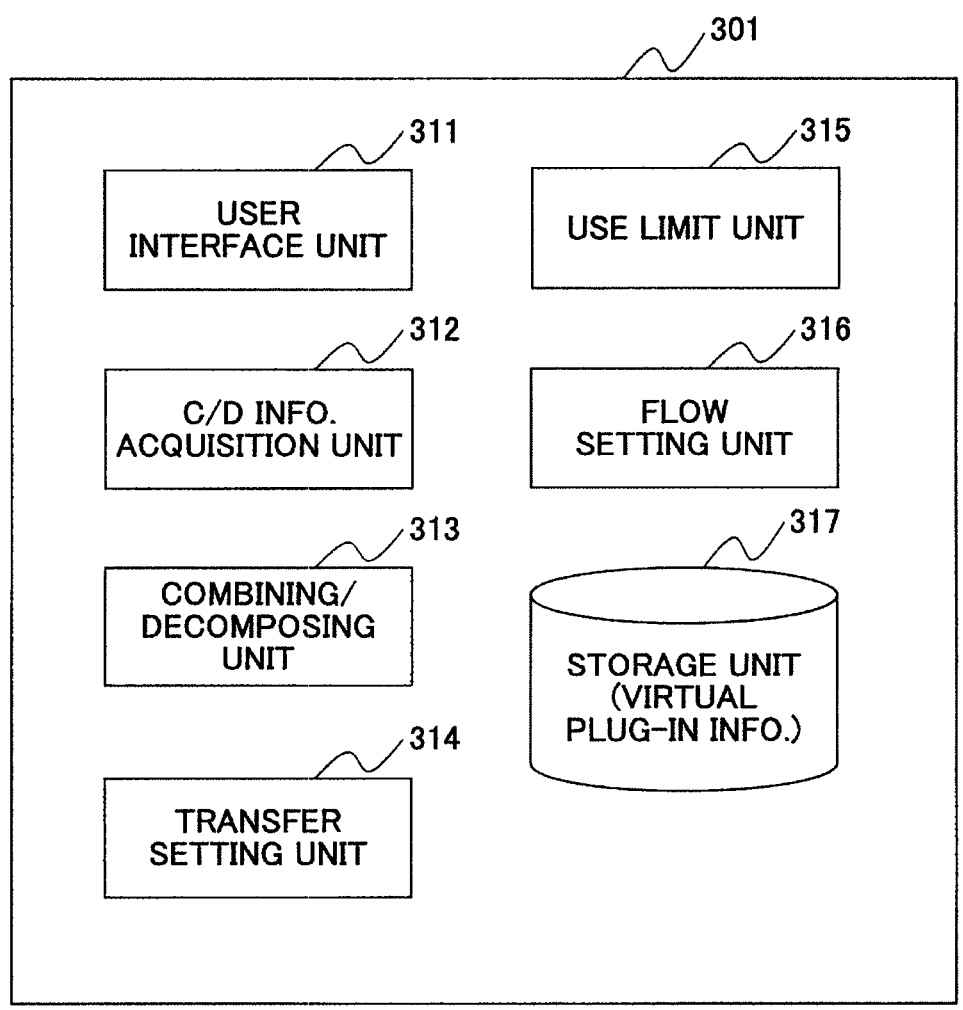
FIG. 6 is a block diagram illustrating the functional composition of a workflow setting unit.

Next, the workflow setting unit 301 will be described. FIG. 6 illustrates the functional composition of the workflow setting unit 301. As illustrated in FIG. 6, the workflow setting unit 301 includes a user interface unit 311, a combining/decomposing information acquisition unit 312, a combining/decomposing unit 313, a transfer setting unit 314, a use limit unit 315, a flow setting unit 316, and a storage unit 317.

The user interface unit 311 controls a UI screen for setting up a workflow. The user interface unit 311 displays a UI screen on the display unit 18 or a display unit of the information processing terminal, and receives the input specification of a workflow and the input setting data of a plug-in module. Examples of the UI screen will be described later.

When the user requests combination (grouping) of plug-in modules in the UI screen displayed by the user interface unit 311, the combining/decomposing information acquisition unit 312 acquires the information of the plug-in modules to be combined (for example, a plug-in ID and a plug-in name). The combining/decomposing information acquisition unit 312 incorporates the acquired plug-in information of the plug-in modules to be combined into combining information, and outputs the combining information to the combining/decomposing unit 313. The combined plug-in will be referred to as a virtual plug-in. The plug-in modules to be combined include at least two plug-in modules.

When the user requests decomposition of a virtual plug-in in the UI screen displayed by the user interface unit 311, the combining/decomposing information acquisition unit 312 acquires the information of the virtual plug-in to be decomposed (for example, a plug-in ID). The combining/decomposing information acquisition unit 312 incorporates the acquired plug-in information of the virtual plug-in to be decomposed into decomposing information, and outputs the decomposing information to the combining/decomposing unit 313.

The combining/decomposing unit 313 acquires the combining information, including the plug-in information for combination, from the combining/decomposing information acquisition unit 312. Subsequently, the combining/decomposing unit 313 assigns a new plug-in ID and a new name to the virtual plug-in and stores the virtual plug-in in the storage unit 306.

The combining/decomposing unit 313 associates the plug-in information for combination with the new plug-in ID and stores the same in the storage unit 317. Thereby, the plug-in modules contained in the virtual plug-in can be searched by accessing the storage unit 317.

The combining/decomposing unit 313 acquires the decomposing information, including the plug-in information of the virtual plug-in for decomposition, from the combining/decomposing information acquisition unit 312. Subsequently, the combining/decomposing unit 312 deletes the information relevant to the plug-in information included in the acquired decomposing information from the storage unit 317. Thereby, the combined virtual plug-in can be deleted, that is, the virtual plug-in can be decomposed.

The transfer setting unit 314 enables the user to determine, when combining plug-in modules in the UI screen, whether the setting data of each plug-in module are to be transferred, or new setting data are to be set up. For example, the user interface unit 311 may be arranged to display, after the user requests combination of plug-in modules in the UI screen, a check box which requests the user to determine whether the setting data of each plug-in module are to be transferred. The information on whether to be transferred or not, which is acquired by the transfer setting unit 314, may be stored in the storage unit 317 for every virtual plug-in.

The use limit unit 315 acquires the information of a hierarchical level to which use of a virtual plug-in is permitted. Suppose that the hierarchy of the image processing system is divided into the whole system, an individual MFP, and an individual project. For example, if permission of use of a virtual plug-in is limited to the whole system, the virtual plug-in can be used in the whole image processing system. If permission of use of a virtual plug-in is limited to an individual MFP, the virtual plug-in can be used by only the MFP. If permission of use of a virtual plug-in is limited to an individual project, the virtual plug-in can be used by only the project. The information which indicates the hierarchical level, acquired by the use limit unit 315, may be stored in the storage unit 317 for every virtual plug-in.

By using the UI screen displayed by the user interface unit 311, the flow setting unit 316 acquires a plug-in ID from the workflow set up by the user, associates the acquired plug-in ID with the workflow, assigns a new workflow ID to the workflow, and stores the same in the storage unit 306. The flow setting unit 316 can incorporate a virtual plug-in into a workflow and set up the workflow, similar to a plug-in module.

The storage unit 317 stores the virtual plug-in information. The virtual plug-in information is information which indicates the combined plug-in modules. For example, the virtual plug-in information is information which associates the name of the combined virtual plug-in and the plug-in ID. The storage unit 317 may be the same as the storage unit 306. The storage unit 317 may be arranged to store each plug-in list such that each plug-in list can be distinguished.

Next, some examples of processes related to plug-in combination will be described. In the following, a plug-in combination process, a decomposition process, a transfer process, a use limit process, a plug-in importing/exporting process, a setting data merging process, and a setting data changing process will be described in this order.

A process of combining plug-in modules will be described. FIG. 7A and FIG. 7B are diagrams for explaining an example of transition of a UI screen which illustrates a combination of plug-in modules.

In the left side portion of each of the UI screens illustrated in FIG. 7A and FIG. 7B, a plug-in list is displayed. In the right side portion of each of the UI screens illustrated in FIG. 7A and FIG. 7B, a workflow (distribution) setting area is displayed. A workflow is created by dragging and dropping a plug-in module contained in the plug-in list, to the workflow setting area.

FIG. 7A illustrates an example in which a combination of plug-in modules is requested in the plug-in list. As illustrated in FIG. 7A, if the user selects plug-in modules for combination and clicks the right-side mouse button, the user interface unit 311 displays a box A which causes the user to determine whether the combination is to be performed. In this example, suppose that "Plug-in A" and "Plug-in C" are to be combined. Subsequently, if the user clicks "combine" in the box A, the combining/decomposing information acquisition unit 312 detects the click and acquires plug-in IDs of "Plug-in A" and "Plug-in C" for combination.

FIG. 7B illustrates an example in which a virtual plug-in is displayed in the plug-in list. If the user clicks "combine" in the state of FIG. 7A, the screen changes to the state of FIG. 7B. The combining/decomposing unit 313 stores an ID and a name of a resulting virtual plug-in into the plug-in list stored in the storage unit 306, so that the acquired plug-in modules for combination are combined. The combining/decomposing unit 313 stores the plug-in IDs of the plug-in modules combined and the ID of the virtual plug-in into the virtual plug-in information stored in the storage unit 317.

FIG. 8 is a diagram for explaining a data structure of a plug-in list stored in the storage unit 306. As illustrated in FIG. 8, in this plug-in list, a plug-in ID (which is also called P-ID), a plug-in name, and setting of operation are associated and stored.

For example, P-ID "001" corresponds to a plug-in name "Plug-in A", and "Setting1", "Setting2", and "Setting3" are associated as the setting of operation of "Plug-in A". Even for one plug-in module, the setting data can be changed and stored. In this case, it is preferred that one of the "setting of operation" data is set up as default setting. The plug-in name "Custom1" of P-ID "005" in FIG. 8 is a name of the virtual plug-in which is created by combining the plug-in modules as illustrated in FIG. 7A and FIG. 7B.

FIG. 9 illustrates a data structure of the virtual plug-in information stored in the storage unit 317. As illustrated in FIG. 9, the virtual plug-in information stored in the storage unit 317 is information which contains association of a P-ID of the virtual plug-in, a name of the virtual plug-in, a P-ID (before), and a P-ID (after). In the virtual plug-in information, P-ID (before) indicates a plug-in ID of the preceding plug-in module in the virtual plug-in flow, and P-ID (after) indicates a plug-in ID of the following plug-in module in the virtual plug-in flow which follows the preceding plug-in module.

It is preferred that a particular setting of operation be associated with respect to each plug-in ID. When a particular setting of operation is not associated, each plug-in ID is based on default setting. In the example illustrated in FIG. 7A, the preceding plug-in module may be determined depending on which of the two selected plug-in modules is selected for the first time.

FIG. 10 illustrates a data structure of the workflow list stored in the storage unit 306. As illustrated in FIG. 10, a workflow ID (which is also called W-ID), a workflow name, a P-ID, and setting of operation are associated in a workflow list, and the workflow list is stored. For example, W-ID "001" corresponds to a workflow name "project A", and setting of operation is associated with each of the P-IDs contained in the "project A" respectively.

In the example of FIG. 10, the workflow of W-ID "003" is created by combining the plug-in module of P-ID "001" and the plug-in module of P-ID "005". P-ID "005" indicates the virtual plug-in as illustrated in FIG. 8 and FIG. 9. The virtual plug-in of P-ID "005" actually expresses that the processes are performed sequentially in order of "Plug-in A (Setting1)" and "Plug-in C (Setting2)".

FIG. 11A and FIG. 11B are diagrams for explaining an example of transition of a UI screen which illustrates a combination of plug-in modules. FIG. 11A illustrates an example in which specifies the plug-in modules for combination are specified after the workflow is created.

In the example illustrated in FIG. 11A, a virtual plug-in is created by selecting "Plug-in A" and "Plug-in C" and combining them together. The creation of a virtual plug-in is the same as that of the example illustrated in FIG. 7A and FIG. 7B.

FIG. 11B illustrates an example in which the virtual plug-in is included in the workflow. The screen illustrated in FIG. 11B indicates that the screen is displayed after clicking "combine" in the box A in the screen illustrated in FIG. 11A.

In the example illustrated in FIG. 11A and FIG. 11B, it can be visually recognized that the virtual plug-in "Custom1" is contained in the workflow.

FIG. 12 illustrates an example of a screen in which a virtual plug-in is further combined to create another virtual plug-in. As illustrated in FIG. 12, three or more plug-in modules may be combined by combination of the virtual plug-in. At this time, a P-ID which indicates the virtual plug-in is described for P-ID (before) and P-ID (after) in the data structure of the virtual plug-in information illustrated in FIG. 9.

In the previously described example, the two plug-in modules are combined together. Alternatively, three or more plug-in modules may be selected simultaneously and combined together by performing the same process.

Figure 13:
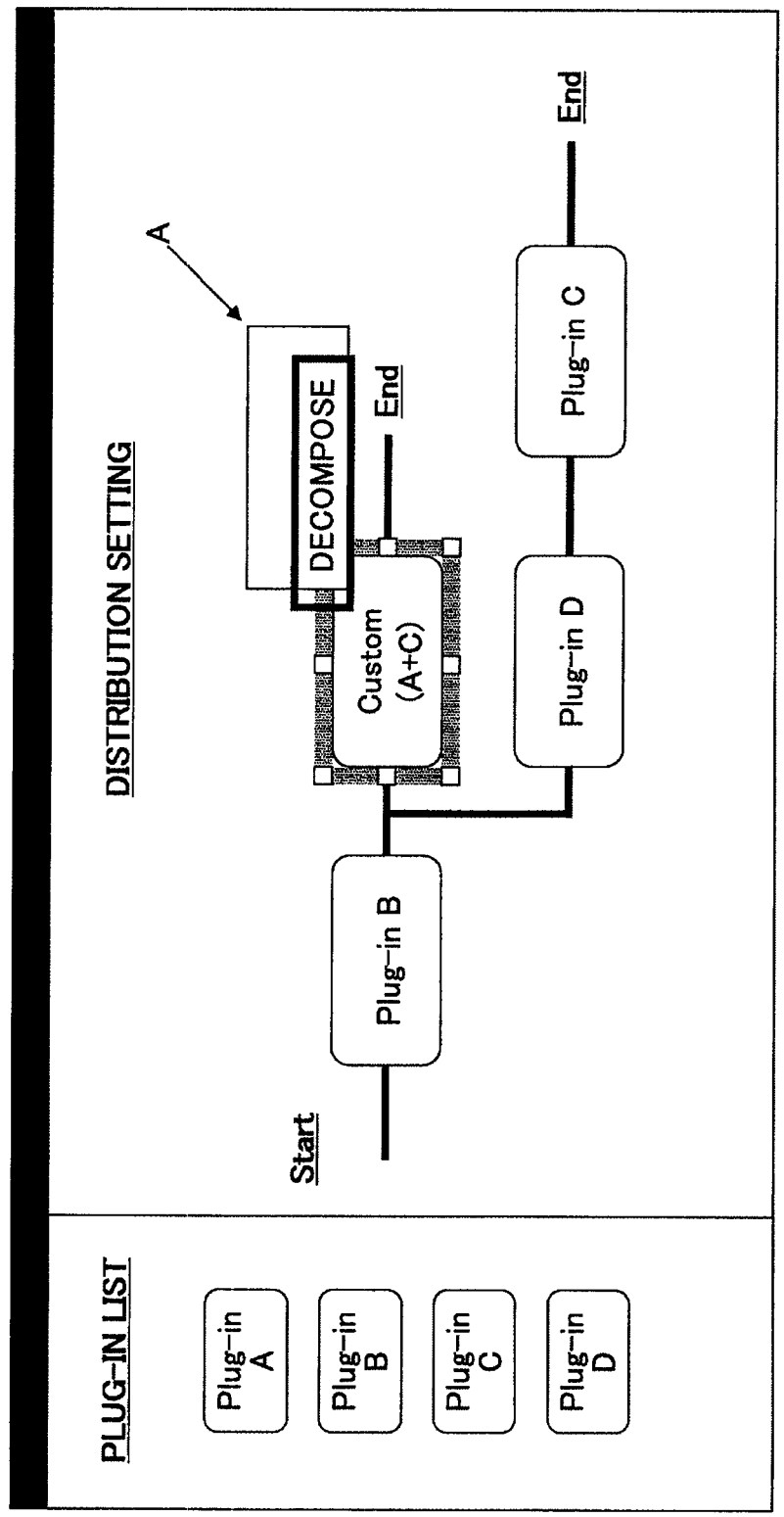
FIG. 13 is a diagram illustrating an example of a screen when a virtual plug-in module is decomposed.

Next, a process of decomposing a virtual plug-in into plug-in modules will be described. FIG. 13 illustrates an example of a screen in which a virtual plug-in is decomposed. In the example illustrated in FIG. 13, when the virtual plug-in "Custom1" is selected and the right-side mouse button is clicked, a box A which enables the user to select "decompose" is displayed by the user interface unit 311. If the user clicks "decompose" in the box A, the combining/decomposing information acquisition unit 312 acquires the plug-in ID of the virtual plug-in the decomposition of which is requested, and outputs the decomposing information containing the acquired plug-in ID to the combining/decomposing unit 313.

The combining/decomposing unit 313 deletes the information associated with the plug-in ID contained in the acquired decomposing information from the virtual plug-in information stored in the storage unit 317. Thereby, the virtual plug-in is decomposed into the plug-in modules.

Figure 14:
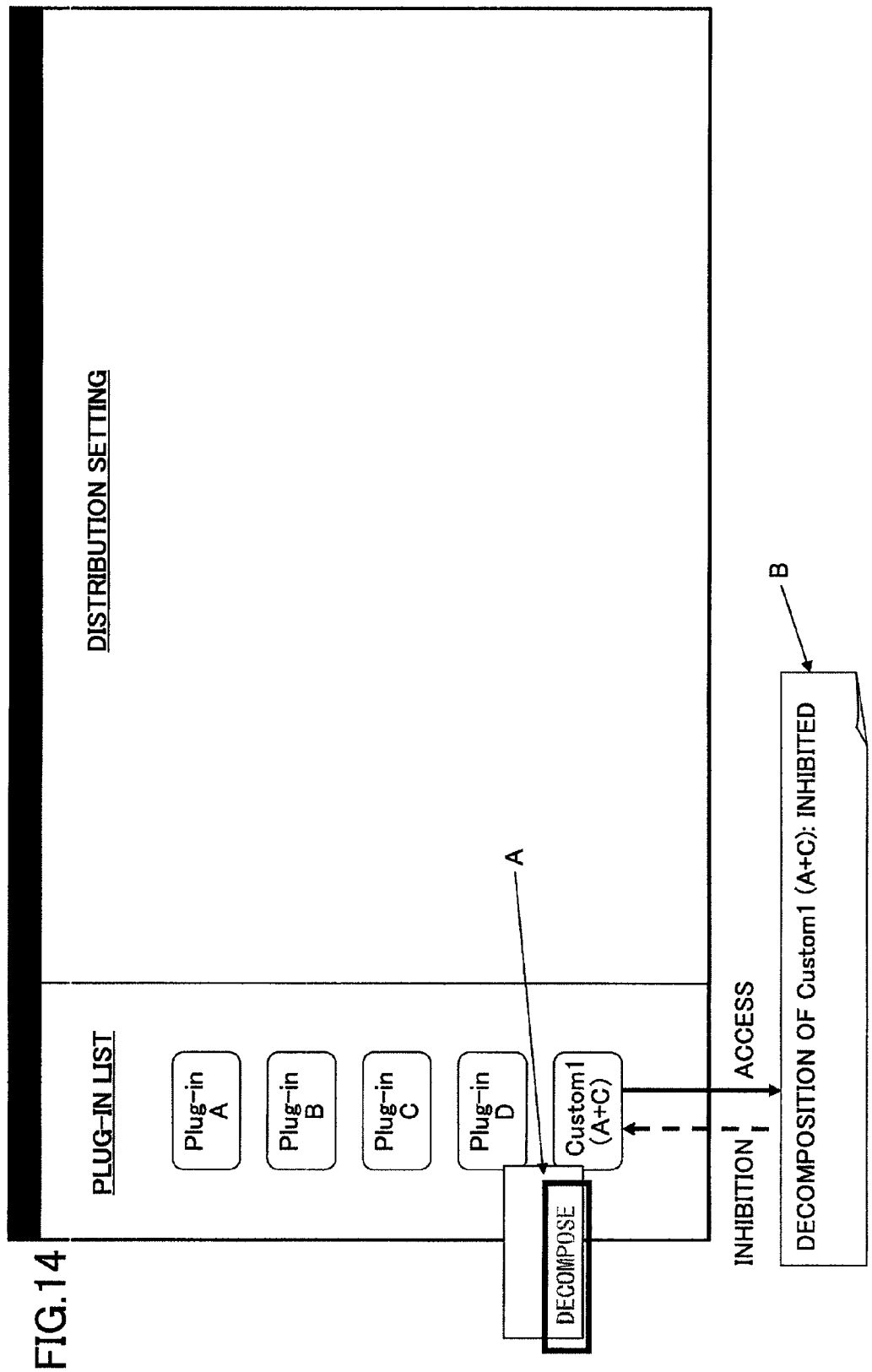
FIG. 14 is a diagram illustrating an example of a screen when decomposition inhibition is set up.

FIG. 14 illustrates an example of a screen when decomposition inhibition is set up. In the example of FIG. 14, suppose that a virtual plug-in "Custom1" is beforehand generated and a setting of inhibition of decomposition of "Custom1" is beforehand stored in an external configuration-file B. If a user who wishes to create a workflow clicks "Custom1" in the screen at this time, the user interface unit 311 accesses the external configuration-file B and detects that the decomposition of "Custom1" is inhibited.

When it is detected that the decomposition of "Custom1" is inhibited, the user interface unit 311 displays the box A in a manner that clicking "decompose" in the screen is not accepted. Thereby, it is possible to prevent the decomposition of the previously created virtual plug-in from being erroneously decomposed by the user.

Next, a transfer process which transfers the setting data of each plug-in module when combining plug-in modules to generate a virtual plug-in will be described.

Figure 15:
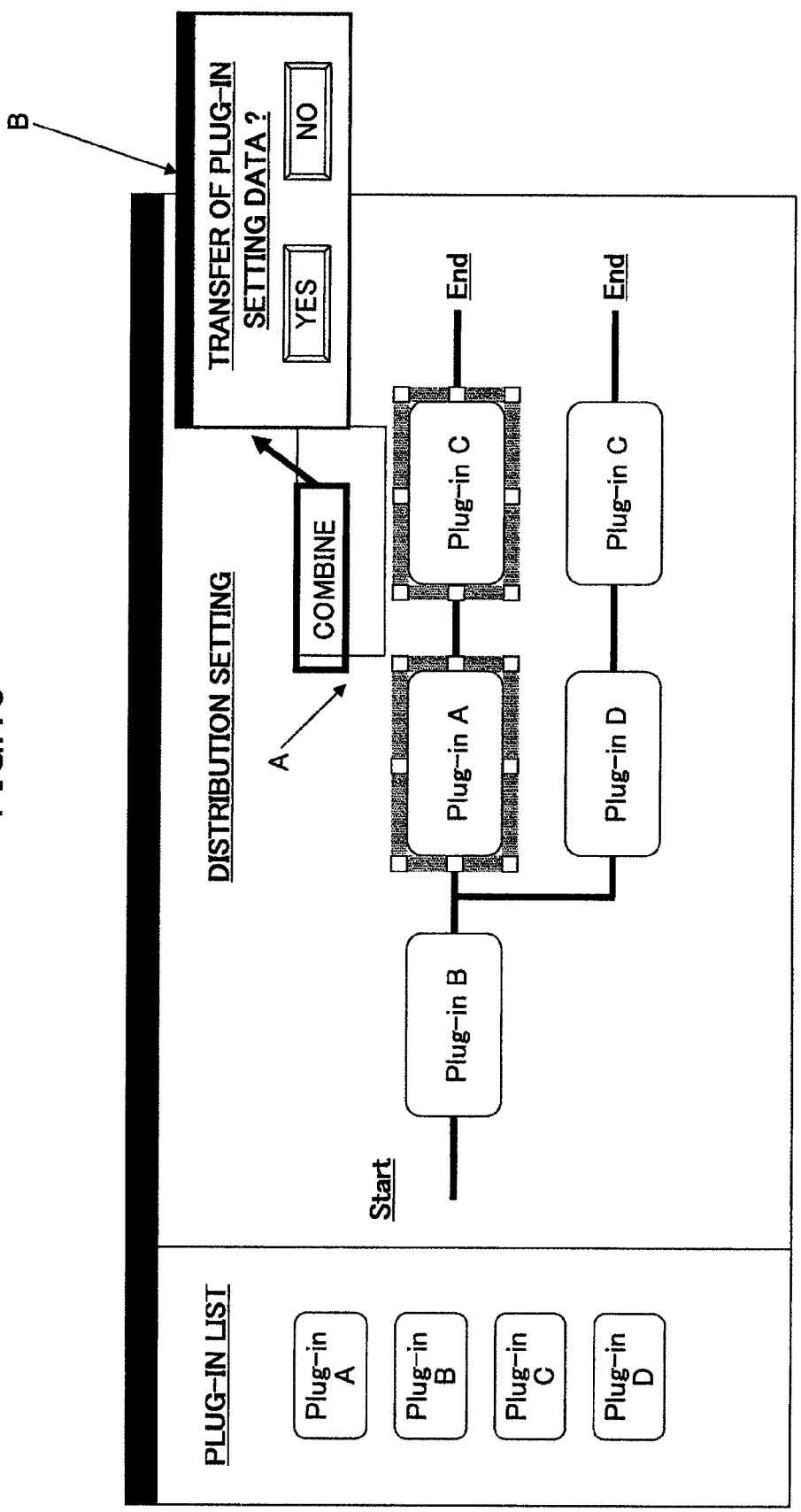
FIG. 15 is a diagram illustrating an example of a screen which enables a user to select a transfer process of setting data.

FIG. 15 illustrates an example of a screen which enables a user to select a transfer process of setting data. As illustrated in FIG. 15, if the user clicks "combine" in the box A, a transfer setting box B is displayed in the screen by the user interface unit 311. This transfer setting box B is to enables the user to determine, when combining the plug-in modules, whether the setting data of each plug-in module are to be transferred.

If the user clicks "YES" in the transfer setting box B, the transfer setting unit 314 stores the Information (transfer setting option) indicating that the setting data are to be transferred, into the virtual plug-in information in the storage unit 317.

FIG. 16 illustrates a data structure of virtual plug-in information including a transfer setting option. As illustrated in FIG. 16, the virtual plug-in of P-ID "005" includes the transfer setting option indicating that the setting data are to be transferred, and the transfer process is performed using the setting data of each plug-in module. As illustrated in FIG. 16, the virtual plug-in of P-ID "008" includes the transfer setting option indicating that the setting data are not to be transferred, and the setting of operation is not associated with the P-ID of each plug-in module. This means that the user must select the setting data each time the user designates the workflow containing the virtual plug-in of P-ID "008".

Next, a use limit process which restricts use of a virtual plug-in when combining plug-in modules to generate the virtual plug-in will be described.

Figure 17:
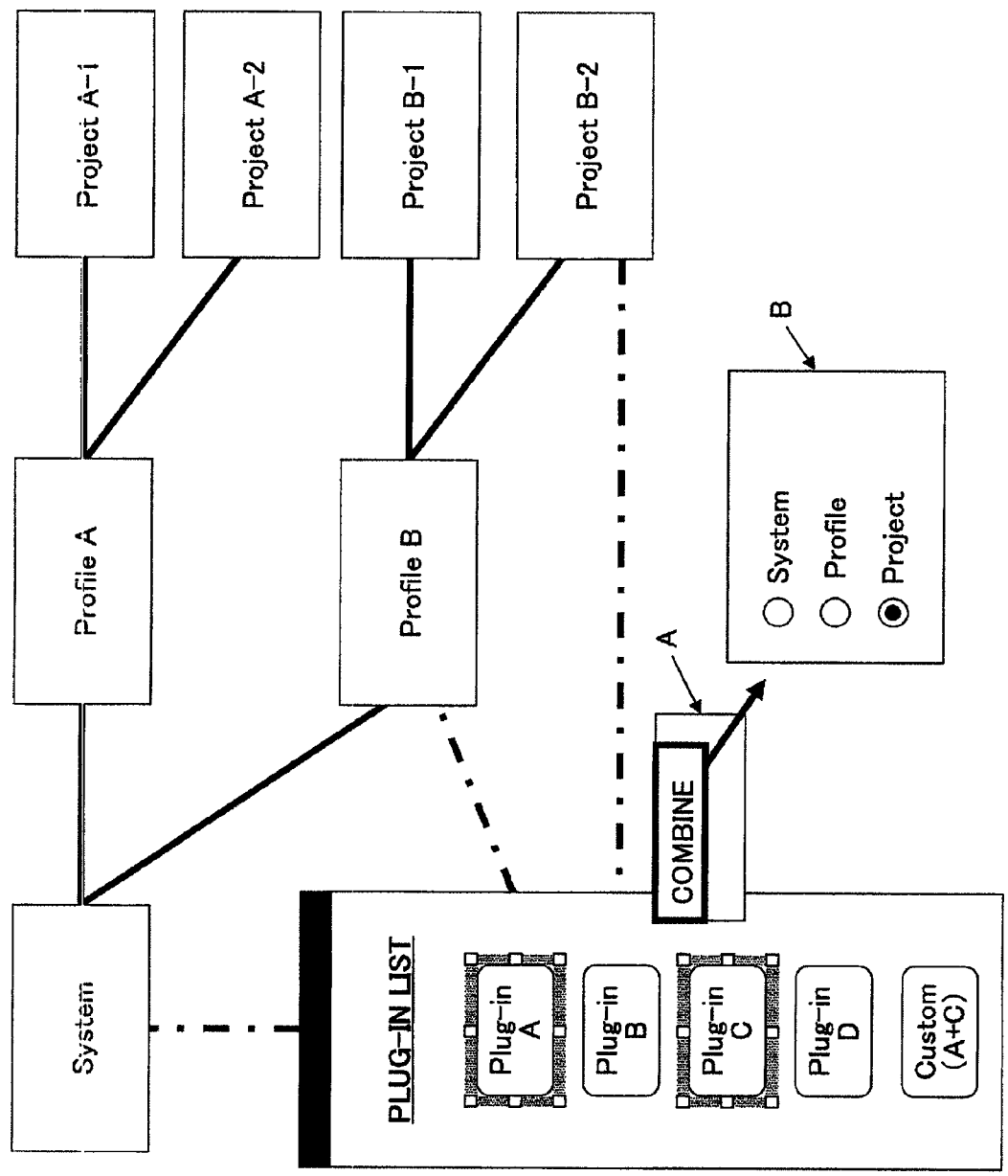
FIG. 17 is a diagram for explaining an example of a hierarchical structure of an image processing system.

FIG. 17 illustrates an example of a hierarchical structure of an image processing system. In the example of FIG. 17, "System" indicates the whole image processing system, "Profile" indicates an MFP, and "Project" indicates a workflow.

As illustrated in FIG. 17, if a user clicks (or selects) "combine" in the box A, the user interface unit 311 displays a check box B indicating a set of hierarchical levels to which use of a virtual plug-in is permitted. If the user selects one of the hierarchical levels in the check box B, the use limit unit 315 stores the information (use limit option) indicating the selected hierarchical level into the virtual plug-in information in the storage unit 317.

FIG. 18 illustrates a data structure of virtual plug-in information including a use limit option. As illustrated in FIG. 18, the use limit of the virtual plug-in of P-ID "005" is set to "Project", and use of the virtual plug-in of P-ID "005" is permitted for the corresponding project. For example, use of the virtual plug-in of P-ID "005" may be permitted for "Project A-1" only.

As illustrated in FIG. 18, the use limit of the virtual plug-in of P-ID "008" is set to "Profile", and use of the virtual plug-in of P-ID "008" is permitting for the corresponding MFP. For example, use of the virtual plug-in of P-ID "008" may be permitted for "Profile A" only.

Next, an import/export process of a virtual plug-in will be described.

Figure 19:
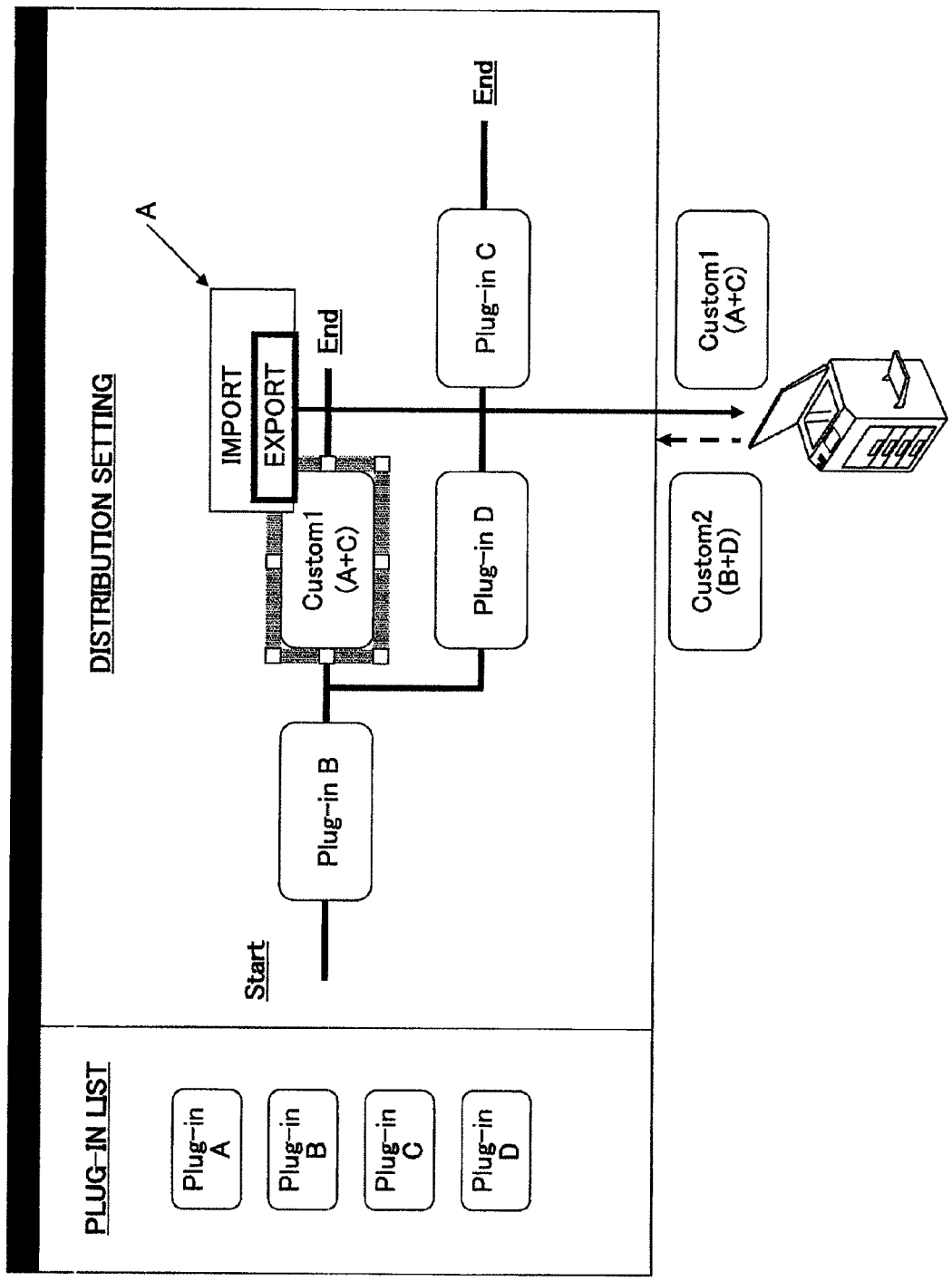
FIG. 19 is a diagram illustrating an example of a screen when an import/export process of a virtual plug-in is performed.

FIG. 19 illustrates an example of a screen when an import/export process of a virtual plug-in is performed. As illustrated in FIG. 19, if a user selects a virtual plug-in "Custom1" and clicks the right-side mouse button, the user interface unit 311 displays a box A which enables the user to select the import or the export.

If the use limit as illustrated in FIG. 18 is set to "System", the export process can be performed freely in the whole image processing system by selecting the export in the box A. If the use limit is set to "Profile", the export process can be performed only to the corresponding MFP by selecting the export in the box A. If the use limit is set to "Project", the export process cannot be performed to any MFP. In this case, the user interface unit 311 displays the box A in a manner that selecting the export is not accepted. When there is no setting of the use limit, the import process and/or the export process can be performed freely.

The import/export process is performed by using the communication unit 302. An imported virtual plug-in is stored into the plug-in list in the storage units 306. Also in the virtual plug-in information in the storage unit 317, the IDs of the plug-in modules contained in a virtual plug-in are associated and stored.

Next, a merging process of an overlapping setting of plug-in modules when combining plug-in modules to generate a virtual plug-in will be described.

FIG. 20A and FIG. 20B are diagrams for explaining a data structure when a merging process is performed. The data structures illustrated in FIG. 20A and FIG. 20B are examples of a data structure of a workflow list stored in the storage unit 306.

FIG. 20A illustrates an example of the data structure of the workflow list before a virtual plug-in is generated. In the example of FIG. 20A, the workflow with the name "ProjectA" is to perform sequentially the processes of plug-in modules "ToFolder" and "ToSMTP" in this order. The setting data are set to each plug-in module for every setting item.

FIG. 20B illustrates an example of the data structure of the workflow list when the plug-in modules "ToFolder" and "ToSMTP" are combined to generate a virtual plug-in. As illustrated in FIG. 20B, when combining the plug-in modules and there is an overlapping setting data of the plug-in modules, the combining/decomposing unit 313 merges the overlapping setting data. Thereby, the image processing system can provide easy setting of the user when using the virtual plug-in.

Next, a change process which changes the setting data of a plug-in module when combining the plug-in modules to generate a virtual plug-in will be described.

FIG. 21A and FIG. 21B are diagrams for explaining a data structure when setting data of a plug-in module is changed. The data structures illustrated in FIG. 21A and FIG. 21B are examples of a data structure of a workflow list stored in the storage unit 306.

FIG. 21A illustrates an example of the data structure of the workflow list before a virtual plug-in is generated. In the example of FIG. 21A, the workflow with the name "ProjectB" is to perform sequentially the processes of plug-in modules "SCAN" and "OCR" in this order.

FIG. 21B illustrates an example of the data structure of the workflow list when "SCAN" and "OCR" are combined to generate a virtual plug-in. As illustrated in FIG. 21B, the setting data of the setting item "resolution" is changed to "300" for the virtual plug-in generated by combining "OCR" and "SCAN". Because the setting item "up/down recognition" of the "OCR" is set to "NO", the change process is performed based on the idea that the setting item "resolution" of the "SCAN" changing to "300" is adequate.

In order to perform the setting data change process described above, setting data linkage information may be stored in the storage unit 306. The setting data linkage information stored in the storage unit 306 may define a suitable setting data of a particular setting item of a particular plug-in module by considering the relation with the setting data of other setting items. The combining/decomposing unit 313 accesses the setting data linkage information, when combining the plug-in modules, and is able to automatically change the setting data to a suitable value based on the setting data linkage information.

The decomposition process, the transfer process, the use limit process, the import/export process, the merging process, and the setting data change process described above are not essential to the image processing server 30, and any of these processes may be installed in the image processing server 30 when required.

Figure 22:
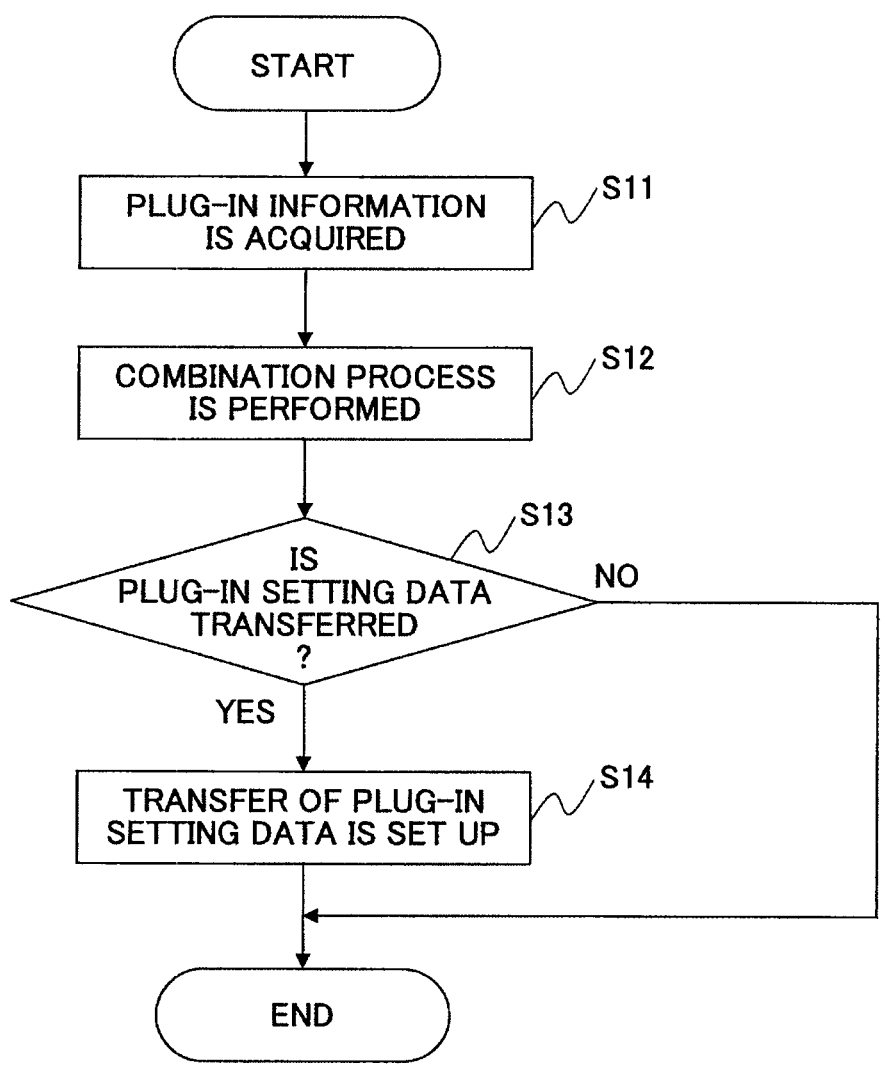
FIG. 22 is a flowchart for explaining a plug-in combination process of the first embodiment of the present disclosure.

Next, operation of the image processing server of the first embodiment will be described. FIG. 22 is a flowchart for explaining a plug-in combination process of the first embodiment.

As illustrated in FIG. 22, in step S11, the combining/decomposing information acquisition unit 312 acquires the plug-in information of the plug-in modules for combination (for example, plug-in IDs).

In step S12, the combining/decomposing unit 313 performs the combination process based on the information received from the combining/decomposing information acquisition unit 312.

Specifically, the combining/decomposing unit 313 assigns a new plug-in ID and a virtual plug-in name, and stores the new plug-in ID and the virtual plug-in name into the plug-in list in the storage unit 306. Subsequently, the combining/decomposing unit 313 associates the plug-in IDs of the plug-in modules combined with the new plug-in ID and stores the same into the virtual plug-in information in the storage unit 317.

In step S13, the transfer setting unit 314 determines whether the setting data of the plug-in modules are to be transferred. This determination is made by the transfer setting unit 314 by acquiring from the user interface unit 311 the transfer setting information which is determined depending on the button "Yes" or "NO" (see FIG. 15) having been clicked by the user. When the result of the determination in step S13 is affirmative (to be transferred), the control progresses to step S14. When the result of the determination in step S13 is negative (not to be transferred), the plug-in combination process is terminated.

In step S14, the transfer setting unit 314 associates with the plug-in ID of the virtual plug-in the information indicating that the setting data of the plug-in modules are to be transferred, and stores the same in the storage unit 317. After the step S14 is performed, the plug-in combination process is terminated.

In the plug-in combination process of FIG. 22, the use limit process and the merging process are not performed. Alternatively, these processes may be performed suitably along with the plug-in combination process.

As described in the foregoing, according to the first embodiment of the present disclosure, plug-in modules are arbitrarily combined to generate a virtual plug-in, and a workflow can be set up by using the generated virtual plug-in and. When generating a virtual plug-in, the setting data of each plug-in module may be transferred, or the overlapping setting data may be merged. A range of the system to which use of the virtual plug-in is permitted may be set up. When generating a virtual plug-in, the setting data of a setting item of a plug-in module may be automatically changed to a suitable setting data by considering the relation with the setting data of other setting items.

Next, an image processing server of a second embodiment of the present disclosure will be described.

In the second embodiment, before combining plug-in modules, it is determined whether the combination of the plug-in modules is permissible. Thereby, it is possible to avoid the combination of plug-in modules putting heavy loads on the resources and avoid the combination of plug-in modules causing inappropriate relation of the setting data of the plug-in modules.

The functional composition of the image processing server of the second embodiment will be described. The image processing server of the second embodiment has a functional composition that is the same as that of the first embodiment except the workflow setting unit. Hence, a description will be given of only the workflow setting unit of the second embodiment.

Figure 23:
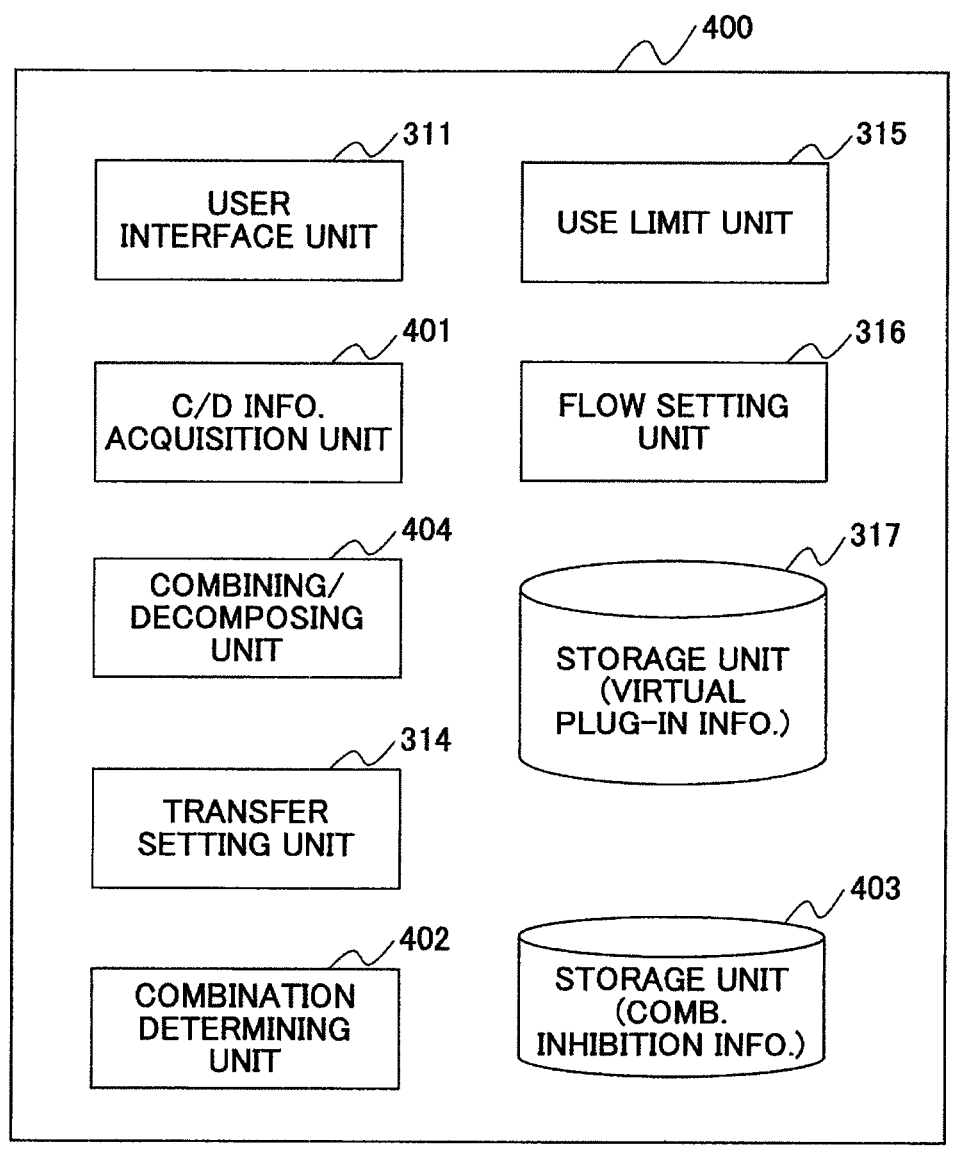
FIG. 23 is a block diagram illustrating the functional composition of a workflow setting unit of a second embodiment of the present disclosure.

FIG. 23 illustrates the functional composition of a workflow setting unit 400 of the second embodiment. As illustrated in FIG. 23, the workflow setting unit 400 includes the user interface unit 311, a combining/decomposing information acquisition unit 401, a combining/decomposing unit 404, the transfer setting unit 314, a combination determining unit 402, the use limit unit 315, the flow setting unit 316, the storage unit 317, and a storage unit 403.

In FIG. 23, the elements which are the same as corresponding elements of the workflow setting unit 301 in FIG. 6 are designated by the same reference numerals, and a description thereof will be omitted.

When the user requests combination of plug-in modules in the UI screen displayed by the user interface unit 311, the combining/decomposing information acquisition unit 401 acquires the combining information including the information of the plug-in modules for combination (for example, a plug-in ID and a plug-in name). The combining/decomposing information acquisition unit 401 outputs the combining information to the combination determining unit 402.

The combination determining unit 402 acquires the combining information of the plug-in modules for combination from the combining/decomposing information acquisition unit 401, accesses the combination inhibition information stored in the storage unit 403, and determines whether the requested combination is the combination included in the combination inhibition information. The combination inhibition information is information which indicates a combination of plug-in modules which is inhibited and/or a combination of the setting data of plug-in modules which is inhibited.

The combination determining unit 402 determines whether the requested combination is the combination included in the combination inhibition information, and notifies the result of the determination to the combining/decomposing unit 404.

The combination determining unit 402 may be arranged to notify the information indicating that the plug-in modules included in the requested combination cannot be combined, to the user interface unit 311, causing the user interface unit 311 to display an error message. Alternatively, the image processing server may be arranged so that the combining/decomposing unit 404 and the combination determining unit 402 are united to one functional block.

When the combination inhibition information contains a combination of inappropriate setting data of plug-in modules, the combination determining unit 402 may be arranged to make a determination based on the combination of inappropriate setting data. Namely, if the user specifies transfer of the setting data of plug-in modules when combining the plug-in modules and the setting data of the plug-in modules for combination are included in the combination inhibition information, it is determined that the plug-in modules included in the requested combination cannot be combined.

Alternatively, the combination determining unit 402 may be arranged so that, when the setting data of the plug-in modules for combination are included in the combination inhibition information, the combination determining unit 402 determines that transfer of the setting data cannot be performed. At this time, the combination determining unit 402 notifies the combining/decomposing unit 404 that transfer of the setting data cannot be performed.

The storage unit 403 stores the combination inhibition information. FIG. 24A and FIG. 24B are diagrams for explaining a data structure of combination inhibition information. For example, the combination inhibition information in a list structure as in FIG. 24A and FIG. 24B is stored in the storage unit 403.

FIG. 24A illustrates an example of the combination inhibition information. In the example of FIG. 24A, the plug-in IDs the plug-in combination of which is inhibited are associated with each other. In the example of FIG. 24A, combination of the plug-in module of plug-in ID "001" and the plug-in module of plug-in ID "005" is inhibited. Combining the plug-in modules putting heavy loads on the resources (for example, the plug-in modules requiring a large amount of memory) will make the device operation unstable. In this case, the combination inhibition information may be arranged to define a combination of plug-in modules making the device operation unstable. For example, OCR is a plug-in module which requires a large amount of memory.

FIG. 24B illustrates an example of the combination inhibition information. In the example of FIG. 24B, the plug-in modules causing inappropriate relation of the setting data of the plug-in modules are associated. For example, when the setting data of "SCAN" is "A4" and the setting data of "OCR" is "A3", combining these plug-in modules may cause a transaction error because of mismatching of the setting data. To avoid this, combination of "SCAN" and "OCR" may be inhibited or transfer of the setting data may be inhibited.

The combination inhibition information of either or both of the examples illustrated in FIG. 24A and FIG. 24B may be stored in the storage unit 403.

When a notification indicating that the plug-in modules cannot be combined is received from the combination determining unit 402, the combining/decomposing unit 404 does not perform the combination process. When a notification indicating that the plug-in modules cannot be combined because of inappropriate relation of the setting data is received from the combination determining unit 402, the combining/decomposing unit 404 may output to the user a message indicating that transfer of the setting data is not performed, and may combine the plug-in modules without transferring the setting data.

Next, operation of the image processing server of the second embodiment will be described.

Figure 25:
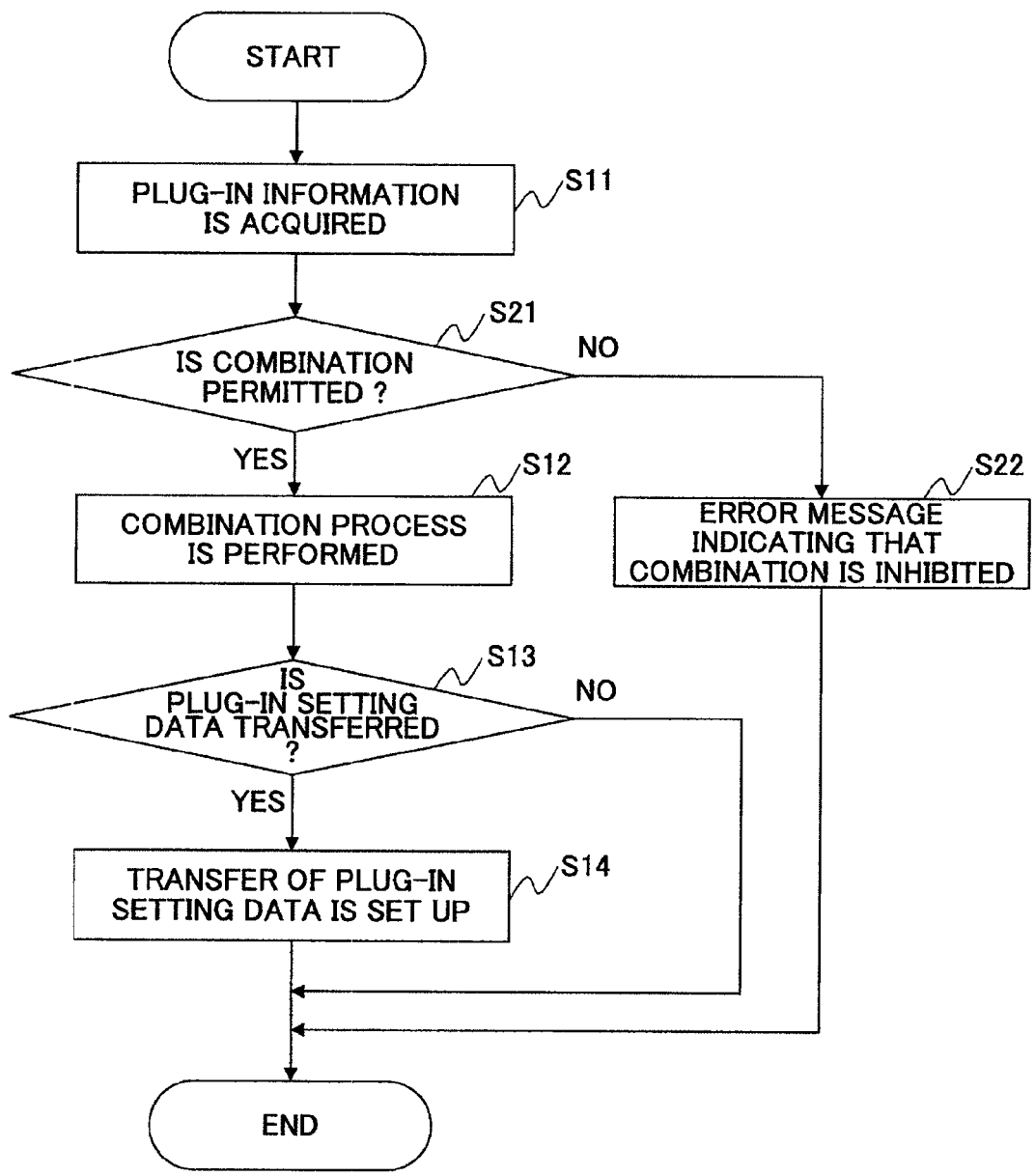
FIG. 25 is a flowchart for explaining a combination process of the second embodiment.

FIG. 25 is a flowchart for explaining a combination process of the second embodiment. In FIG. 25, the steps which are the same as corresponding steps of the combination process in FIG. 22 are designated by the same reference numerals, and a description thereof will be omitted.

In step S21 of the combination process of FIG. 25, the combination determining unit 402 determines whether the requested combination is permitted, depending on whether the plug-in information of the plug-in modules for combination is contained in the combination inhibition information.

When the result of the determination in step S21 is affirmative (the combination is permitted), the control progresses to step S12. When the result of the determination in step S21 is negative (the combination is not permitted), the control progresses to step S22.

In step S22, the user interface unit 311 receives from the combination determining unit 402 a notification indicating that the plug-in modules cannot be combined, and displays an error message indicating that the plug-in modules cannot be combined on the display unit.

Alternatively, when the notification received in step S22 indicates that the plug-in modules cannot be combined because of inappropriate relation of the setting data, the combining/decomposing unit 404 may be arranged to combine the plug-in modules without transferring the setting data.

As described in the foregoing, according to the second embodiment, before combining plug-in modules, it is determined whether the requested combination is permitted. It is possible to avoid the combination of plug-in modules putting heavy loads on the resources and avoid the combination of plug-in modules causing inappropriate relation of the setting data of the plug-in modules.

Next, an image forming device of a third embodiment of the present disclosure will be described. In the third embodiment, the above-described image processing server is incorporated in the MFP.

Figure 26:
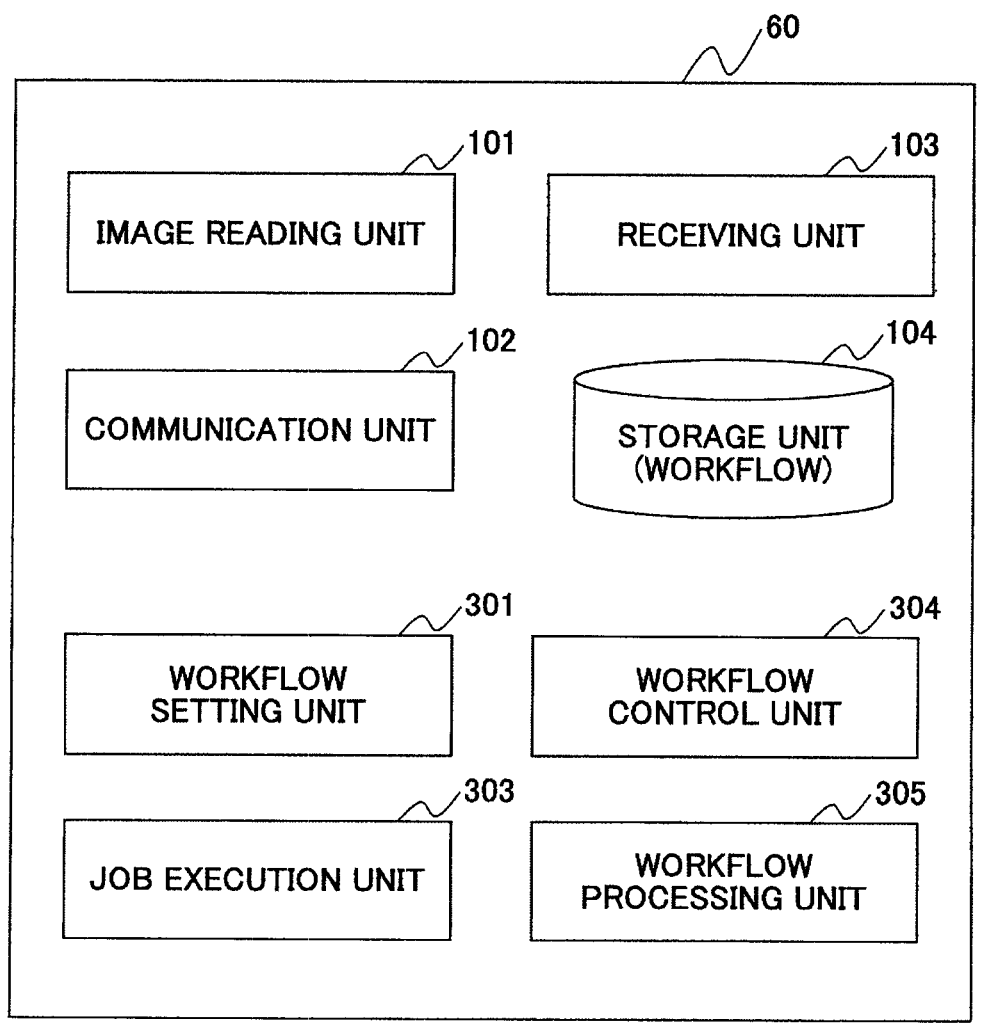
FIG. 26 is a block diagram illustrating the functional composition of an image forming device of a third embodiment of the present disclosure.

FIG. 26 illustrates the functional composition of the image forming device of the third embodiment. As illustrated in FIG. 26, the composition of the image forming device of the third embodiment in which the image processing server is incorporated is essentially the same as the composition of the image forming device and the image processing server illustrated in FIG. 5. Hence, according to the image forming device 60 of the third embodiment, the processes illustrated in the foregoing embodiments can be performed by the MFP solely.

The image forming device 60 of the third embodiment has both the server function and the MFP function, and it is necessary to use the hardware resources of the MFP efficiently in order to prevent the device operation from becoming unstable. The image forming device 60 of the third embodiment is arranged to hold the above-described combination inhibition information as in the second embodiment, and the workflow setting unit 301 of the third embodiment is arranged to include the combination determining unit 402 as in the second embodiment to determine whether the requested combination is the combination included in the combination inhibition information. Therefore, the functions of the image forming device 60 can be carried out in a stable manner.

The image processing server of each of the foregoing embodiments is provided with the control unit (such as CPU), the main memory unit (such as ROM and RAM) and the secondary memory unit (such as HDD or CD drive), and has the hardware composition using a workstation or a computer.

Each of the programs executed by the image processing server of the first or second embodiment or by the MFP of the third embodiment is stored as an installable format file or an executable format file on a computer-readable recording medium, such as a CD-ROM, a flexible disk (FD), a CD-R, or a DVD (digital versatile disk), and the computer-readable recording medium may be distributed.

The programs executed by the image processing server of the first or second embodiment or by the MFP of the third embodiment may be stored on a computer connected to a network, such as the Internet, and may be downloaded from the computer to the image processing server or the MFP via the network. The programs executed by the image processing server of the first or second embodiment or by the MFP of the third embodiment may be supplied or distributed via the network, such as the Internet.

The programs executed by the image processing server of the first or second embodiment or by the MFP of the third embodiment may be recorded on the ROM beforehand and supplied.

The programs executed by the image processing server of the first or second embodiment or by the MFP of the third embodiment may have the configuration of the modules including the respective units described above. Each program is read from the recording medium loaded on the main memory unit, and when executed by a computer, causes the computer to perform the functions of the modules on the main memory unit.

As described in the foregoing, in order to solves or reduces one or more of the previously described problems, the present disclosure provides an image processing method for use in an image processing device adapted to acquire image data and distribute the image data, and including a storage unit to store respective plug-in modules of an input process, an image transforming process, and an output process with respect to the image data, the image processing method including: acquiring combining information including two or more plug-in identifiers which respectively indicate the plug-in modules stored in the storage unit; combining two or more of the plug-in modules to generate a virtual plug-in based on the acquired combining information; setting up a workflow in which the plug-in modules including the virtual plug-in are combined arbitrarily; and controlling processes included in the workflow when a message distribution process based on the workflow is requested.

As described in the foregoing, in order to solves or reduces one or more of the previously described problems, the present disclosure provides a computer-readable recording medium storing a program which, when executed by a computer, causes the computer to execute an image processing method for use in an image processing device adapted to acquire image data and distribute the image data, and including a storage unit to store respective plug-in modules of an input process, an image transforming process, and an output process with respect to the image data, the image processing method including: acquiring combining information including two or more plug-in identifiers which respectively indicate the plug-in modules stored in the storage unit; combining two or more of the plug-in modules to generate a virtual plug-in based on the acquired combining information; setting up a workflow in which the plug-in modules including the virtual plug-in are combined arbitrarily; and controlling processes included in the workflow when a message distribution process based on the workflow is requested.

According to the present disclosure, it is possible to provide an image forming device, an image processing system, an information processing method, and a recording medium which are capable of combining plug-in modules arbitrarily to generate a virtual plug-in and setting up a workflow by using the generated virtual plug-in.

The present invention is not limited to the specifically disclosed embodiments, and variations and modifications may be made without departing from the scope of the present invention.

The present application is based on Japanese patent application No. 2009-165046, filed on Jul. 13, 2009, the contents of which are incorporated herein by reference in their entirety.

What is claimed is:

1. An information processing apparatus which includes a processor and a memory, comprising:
   a user interface unit configured to display a screen, on a display unit, for setting a workflow including one or more processes, the screen including two or more selection items for selecting the one or more processes, at least one of the selection items including a plug-in process which is processed by a plug-in module having unique plug-in identification information, and at least one of the selection items including a virtual plug-in process which is processed by a combination of two or more plug-in modules which perform two or more mutually different processes sequentially, the virtual plug-in process and the two or more plug-in modules each having unique plug-in identification information, the virtual plug-in process including virtual plug-in information that identifies the two or more plug-in modules and identifies an order in which the two or more plug-in modules are to be performed; and a flow setting unit configured to set up the workflow and store workflow information of the workflow in a storage unit.

2. The information processing apparatus according to claim 1, further comprising:

a receiving unit configured to receive a selection of two or more selection items to be combined into a selection item that is a virtual plug-in process, wherein the user interface is further configured to display on the screen the virtual plug-in process combined from the two or more selection items received by the receiving unit.

3. The information processing apparatus according to claim 2, wherein the receiving unit receives the selection of two or more selection items with a processing order of each of the two or more selection items.

4. The information processing apparatus according to claim 3, further comprising:

a job execution unit configured to receive an execution request of the workflow set up by the flow setting unit; and a workflow control unit configured to control execution of the one or more processes of the workflow execution request received by the job execution unit.

5. The information processing apparatus according to claim 2, further comprising:

a first setting information setting unit configured to store setting information about the processes processed by the plug-in modules; and a second setting information setting unit configured to store setting data linkage information applied to the workflow on the basis of the setting information of the two or more selection items received by the receiving unit, wherein the flow setting unit sets up the workflow including two or more processes from two or more selection items.

6. The information processing apparatus according to claim 5, further comprising:

a combination determining unit configured to determine when setting information of each of the two or more selection items to be combined are incompatible with each other upon determination that the combination of the setting information of each of the two or more selection items to be combined would cause a transaction error in the workflow.

7. The information processing apparatus according to claim 6, wherein the setting information of each of the two or more plug-in modules is related to a paper size.

8. The information processing apparatus according to claim 1, further comprising:

a transfer setting unit configured to receive transfer setting information indicating whether setting data of the two or more plug-in modules are to be transferred for the virtual plug-in process, wherein the user interface unit is configured to display a request on the display unit requesting an input of the transfer setting information.

9. An information processing apparatus which includes a processor and a memory, comprising:

a user interface unit configured to display a screen, on a display unit, for setting a workflow including one or more processes, the screen including two or more selection items for selecting the one or more processes, at least one of the selection items including a plug-in process which is processed by a plug-in module having unique plug-in identification information, and at least one of the selection items including a virtual plug-in process which is processed by a combination of two or more plug-in modules which perform two or more mutually different processes sequentially, the virtual plug-in process and the two or more plug-in modules each having unique plug-in identification information, the virtual plug-in process including virtual plug-in information that identifies the two or more plug-in modules and identifies an order in which the two or more plug-in modules are to be performed;

a flow setting unit configured to set up the workflow and store workflow information of the workflow in a storage unit;

a receiving unit configured to receive a selection of two or more selection items to be combined into a selection item that is a virtual plug-in process; and a combination determining unit configured to determine when setting information of each of the two or more selection items to be combined are incompatible with each other upon determination that the combination of the setting information of each of the two or more selection items to be combined would cause a transaction error in the workflow.

10. The information processing apparatus according to claim 9, wherein upon determination that the two or more selection items to be combined are incompatible with each other, a combining unit combines the two or more selection items to be combined into the selection item that is a virtual plug-in process, but does not transfer the setting data of the two or more selection items to be combined into the selection item that is the virtual plug-in process.

11. The information processing apparatus according to claim 10, wherein upon determination that the two or more selection items to be combined are incompatible with each other, a combining unit does not combine the two or more selection items to be combined into the selection item that is a virtual plug-in process.

* * * * *